US012736502B2

(12) United States Patent
Michelmann et al.

(10) Patent No.: US 12,736,502 B2
(45) Date of Patent: Sep. 15, 2026

(54) DIFFERENTIAL TRAPPED ION MOBILITY FILTER

(71) Applicant: Bruker Daltonics GmbH & Co. KG, Bremen (DE)

(72) Inventors: Karsten Michelmann, Bremen (DE); Melvin Park, Billerica, MA (US)

( * ) Notice: Subject to any disclaimer, the term of this patent is extended or adjusted under 35 U.S.C. 154(b) by 285 days.

(21) Appl. No.: 18/757,074

(22) Filed: Jun. 27, 2024

(65) Prior Publication Data

US 2025/0003924 A1 Jan. 2, 2025

Related U.S. Application Data

(60) Provisional application No. 63/510,718, filed on Jun. 28, 2023.

(51) Int. Cl.
*G01N 27/624* (2021.01)
*G01N 27/623* (2021.01)

(52) U.S. Cl.
CPC ......... *G01N 27/624* (2013.01); *G01N 27/623* (2021.01)

(58) Field of Classification Search
CPC combination set(s) only.
See application file for complete search history.

(56) References Cited

U.S. PATENT DOCUMENTS

| | | | | |
|---|---|---|---|---|
| 6,630,662 B1 * | 10/2003 | Loboda | G01N 27/623 | 250/281 |
| 7,838,826 B1 * | 11/2010 | Park | G01N 27/623 | 250/281 |
| 8,941,054 B2 * | 1/2015 | Park | G01N 27/622 | 250/282 |
| 9,683,964 B2 * | 6/2017 | Park | H01J 49/0031 | |
| 2013/0306858 A1 * | 11/2013 | Giles | H01J 49/04 | 250/283 |
| 2022/0057363 A1 * | 2/2022 | Prabhakaran | H01J 49/10 | |
| 2022/0299473 A1 * | 9/2022 | Park | G01N 27/622 | |

OTHER PUBLICATIONS

Mark Ridgeway et al., poster on "Maximizing Gas Phase Peak Capacity While Minimizing Analysis Time Through," 2013 ASMS Conference on Mass Spectrometry and Allied Topics, Jun. 2013.

(Continued)

*Primary Examiner* — Andrew Smyth
(74) *Attorney, Agent, or Firm* — DECODE Legal Inc.

(57) ABSTRACT

The invention relates to a trapped ion mobility filter, a hybrid mass spectrometric system and a method for analyzing ions. The trapped ion mobility filter comprises an ion channel in which ions move along an axis between a first end, at which ions are introduced into said ion channel, and a second end. Two axial forces acting on the ions are provided, the first axial force being caused by an alternating axial electric field and having an effect on the movement of the ions that is dependent on differential mobility, and the second axial force counteracting the first axial force at least temporarily. The two axial forces are configured such that ions with a first specific range of differential mobility are trapped within the filter region of the ion channel and ions with a differing second specific range of differential mobility are transmitted through the ion channel.

25 Claims, 8 Drawing Sheets

(56) References Cited

OTHER PUBLICATIONS

K. Michelmann et al., Fundamentals of Trapped Ion Mobility Spectrometry, J. Am. Soc. Mass Spectrom., 2015, vol. 26, 14-24.
R. Guevremont et al., Atmospheric Pressure Ion Trapping in a Tandem FAIMS-FAIMS Coupled to a TOFMS: Studies with Electrospray Generated Gramicidin S Ions J Am Soc Mass Spectrom, vol. 12, 1320-1330 (2001).
A. Shvartsburg et al., Differential Ion Mobility Separations in the Low-Pressure Regime, Anal. Chem. 2018, vol. 90, Issue 1, 936-943 (2018).
F. Meier et al., Parallel Accumulation-Serial Fragmentation (PASEF): Multiplying Sequencing Speed and Sensitivity by Synchronized Scans in a Trapped Ion Mobility Device, J. Proteome Res. 2015, vol. 14, 5378-5387 (2015).

* cited by examiner

DIFFERENTIAL TRAPPED ION MOBILITY FILTER

BACKGROUND OF THE INVENTION

Field of the Invention

The invention relates to a trapped ion mobility filter, a hybrid mass spectrometric system and a method for analyzing ions.

Description of the Related Art

Ion mobility spectrometry (IMS) is an analytical technique that is used to investigate the mobility of ions in a gas and to separate them according to their mobility.

An inherent feature of ion mobility spectrometry is that the mobility of ions in a gas depends on molecular geometries of the ions such that it is often possible to resolve and thus separate isomers or conformers that cannot be resolved by mass spectrometry. Many applications also take advantage of the ability to determine the cross section of an analyte ion from its measured mobility. Knowledge of mobilities or cross sections has proven to be significant in many areas including identifying analytes (e.g., in proteomics and metabolomics), separating compound classes and determining molecular structures (e.g., in structural biology).

In trapped ion mobility spectrometry, ions are typically trapped by a spatially non-uniform DC electric field, typically an electric field gradient, and a counteracting gas flow, or along a spatially uniform electric DC field by a counteracting gas flow which has a spatially non-uniform axial velocity profile along the axis. The trapped ions are separated in space according to ion mobility and are subsequently eluted over time according to their mobility by adjusting either the gas velocity or the strength of the axial electric DC field (see, e.g., U.S. Pat. No. 6,630,662 B1 by Loboda and U.S. Pat. No. 7,838,826 B1 by Park). The theoretical basis of trapped ion mobility spectrometry is also described, for example, in the article "Fundamentals of Trapped Ion Mobility Spectrometry" by Michelmann et al. (J. Am. Soc. Mass Spectrom., 2015, 26, 14-24).

A trapped ion mobility separator is known, for example, from U.S. Patent Application Publication No. US 2022/0299473 A1 (Park). The trapped ion mobility separator disclosed there, comprises an ion channel through which ions move along an axis from an entrance to an exit and which has an elongate cross-sectional profile perpendicular to the axis. Another trapped ion mobility separator is known, for example, from U.S. Pat. No. 9,683,964 (Park et al.). The U.S. Pat. No. U.S. Pat. No. 8,941,054 B2 (Park et al.) discloses that a trapped ion mobility separator can be operated as a low-pass or high-pass-mobility filter, when the gas velocity and the strength of the axial electric field are not varied.

Typically, a trapped ion mobility separator is operated at a pressure of some hundred pascal (Pa), and the electric fields used in trapped ion mobility spectrometry ranges from a few volts per cm to several hundred volts per cm (e.g., 200 V/cm). In such a low field limit the ion drift velocity is proportional to the electric field strength and the mobility K is independent of the applied field. However, above an electric field strength to gas particle density ratio (E/N) of about 20 Td (which relates to an electric field strength of approximately 5000 V/cm at atmospheric pressure), the ion drift velocity is no longer directly proportional to the applied electric field, and the mobility K becomes dependent on the applied field, having a considerable non-linear dependence on the electric field (E. A. Mason and E. W. McDaniel ("Transport Properties of Ions in Gases" (Wiley, New York, 1988)). At high electric field strength to particle density ratio, the mobility K is better represented by the low electric field constant mobility K(0) and field dependent terms $\alpha_i$:

$$K(E) = K(0)\left[1 + \alpha_2 (E/N)^2 + \alpha_4 (E/N)^4 + \cdots\right] \quad (1)$$

with $E$ = electric field strength $([E] = V/m)$ and $N$ = particle density $([N] = m^{-3})$ The effect of the dependence of mobility on the applied electric field is used in field asymmetric waveform ion mobility spectrometry (FAIMS), also known as differential mobility spectrometry (DMS). FAIMS, typically performed at atmospheric pressure, separates gas-phase ions based on the difference in mobility of ion species at high electric field strength, $K_H$, relative to mobility at low electric field strength, $K_L$—i.e. the ions' "differential mobility". An ion's differential mobility, dK, as measured via FAIMS is given by equation (2) below. The principles of operation of FAIMS have been described for example in the article "Atmospheric Pressure Ion Trapping in a Tandem FAIMS—FAIMS Coupled to a TOFMS: Studies with Electrospray Generated Gramicidin S Ions" by Guevremont et al. (J. Am. Soc. Mass Spectrom., 2001, 12, 1320-1330). However, using the FAIMS technique, the ions are transmitted through an analyzer region just selectively, whereby all not transmitted ion species are filtered out and are discarded by discharging. This is a significant disadvantage, especially when analyzing complex, multicomponent samples. When transmitting a selected component through the FAIMS, all other components are lost.

$$dK(E) = K(0)\left[\alpha_2 (E/N)^2 + \alpha_4 (E/N)^4 + \cdots\right] \quad (2)$$

where $dK(E)$ is the ion's differential mobility.

The article "Differential Ion Mobility Separations in the Low-Pressure Regime" by Shvartsburg et al. (Analytical Chemistry, 2018, 90, 936-943) discloses a FAIMS filter operated in a rough vacuum at a pressure down to 4.7 Torr (6 mbar). U.S. Patent Application Publication No. 2013/0306858A1 discloses a linear ion trap wherein an asymmetric voltage waveform is applied to electrodes forming the ion trap which causes ions to become radially separated according to their differential ion mobility. An axial potential barrier is arranged at the exit of the ion trap such that ions having a first differential ion mobility and a first radial displacement are retained axially within the ion trap but ions having a second differential ion mobility and a second radial displacement are ejected axially from the ion trap.

In view of the foregoing, the present invention is based on the task of advancing and enriching the state of the art and overcoming the disadvantage mentioned above by offering a new trap and separation dimension for ions in trapped ion mobility spectrometry. In particular, the task of the invention can be seen as to provide a trapped ion mobility separator that can be operated as a differential mobility filter, which separates ions by their different behavior of mobility at low and high electric field strength into those which pass the filter and those which are held back in the filter by trapping. Finally, there is still a need to expand and improve the analysis capabilities of hybrid mass spectrometric systems. In the context of the disclosure, a trapped ion mobility separator is hereinafter referred to as a "TIMS", and a trapped ion mobility filter is hereinafter referred to as a "TIMF". In the following the words separator and filter will be used interchangeably in the context of mobility separation.

The invention solves the task on which it is based with a trapped ion mobility filter according to claim 1, a mass spectrometric system according to claim 13, and a method for analyzing ions according to claim 19. Advantageous embodiments of the invention are subject of the dependent claims and are explained in more detail in the following description.

SUMMARY OF THE INVENTION

In a first aspect the invention provides a trapped ion mobility filter comprising

- an ion channel in which ions move along an axis between a first end of said ion channel, at which ions are introduced into said ion channel, and a second end of said ion channel, said ion channel containing a gas through which the ions pass, wherein the ion channel is supplied with radially confining voltages for preventing the ions from escaping the ion channel laterally,
- at least a first electrode and a second electrode arranged spaced apart from each other along said axis of said ion channel for defining an ion filter region therebetween,
- a first generator that causes a first axial force to be exerted on the ions along said axis by applying alternating separating voltages to said first electrode and said second electrode to generate an alternating axial electric field, the first axial force having an effect on the movement of the ions that is dependent on differential mobility by virtue of its interplay with said gas, wherein, at substantially any time, the direction of said first axial force does not change along said axis in said filter region, and wherein said alternating separating voltage is applied so that for a first time interval an electric field with a first field strength is generated, and for a second time interval, following said first time interval, an opposing electric field with a second field strength is generated, which is lower in magnitude than said first field strength, said first time interval lasting a shorter time span than said second time interval,
- a second generator that causes a second axial force to be exerted on the ions along said axis, which is counteracting said first axial force at least temporarily,
- further comprising an electrical controller which communicates with said first generator and said second generator to configure said first axial force and said second axial force such that ions with a first specific range of differential mobility are trapped within said filter region of said ion channel and ions with a second specific range of differential mobility, which is different from said first specific range of differential mobility, are transmitted through said ion channel.

The invention is based on the realization that the differential mobility behavior of ions can be used to advantageously expand the analysis possibilities in a trapped ion mobility separator. In the context of the invention, the term "differential mobility" is defined as the difference in mobility of ion species at high electric field strength, relative to mobility at low electric field strength (see equation (2) above).

In this context, a "low electric field strength" is defined as a field strength in an order of magnitude where the mobility K of the ions is substantially defined by the low electric field constant mobility K(0):

$$K(E) \approx K(0) \tag{3}$$

Or, in other words, and with reference to equation (1) above, the "low electric field strength" represents an electric field strength so low, that the terms $\alpha_i\ (E/N)^i$, which will remain mathematically present, become so small that their contribution in the determination of the mobility K is below a resolution limit and thus negligible. Therefore, the term "low electric field strength" can be used under the assumption, that the mobility K is represented by the low electric field constant mobility K(0), whereas at high electric field strength, the mobility K is better represented by the low electric field constant mobility K(0) and field dependent terms $\alpha_i$ (see equation (1) above).

In the context of the present disclosure, introducing the ions into the ion channel at the first end of the ion channel has to be understood as introducing or inserting or inputting the ions along said axis of the ion channel along which the ions move between the first end and the second end of the ion channel. In particular, that means, the ions are introduced along the axis, along which they are separated. Thus, in the context of the present disclosure, the introduction of the ions into the ion channel, the separation of the ions within the filter region in the ion channel, and the elution of the transmitted ions at the second end of the ion channel takes place collinearly.

In the context of the disclosure, the aforementioned alternating voltages are referred to as alternating separating voltages. The first axial force, caused by applying the aforementioned alternating separating voltages to the first electrode and the second electrode as described above, can be described as a synthesized asymmetric waveform V (t), as it is called in the state of the art. As known from the state of the art, the alternating electric field represented by the asymmetric waveform V (t) may lead to a different mobility behavior of the ions. Different drift velocities of the ions may result as described in the following:

During the first time interval, representing the high-voltage portion of the asymmetric waveform, the ions move in the filter region between the first electrode and second electrode within the ion channel with a longitudinal velocity $v_H$ approximated by $v_H=K_H E_H$, where $E_H$ is the applied high electric field, and $K_H$ is the high-field mobility under the operating conditions (e.g., electric field, pressure, temperature, and the like). The distance traveled by the ions during the first time interval of the asymmetric waveform can be approximated by $d_H=v_H t_H$, where $t_H$ is the duration of the high-field portion. During the longer lasting second time interval, representing the opposite polarity, low-voltage portion of the asymmetric waveform, the lateral velocity is $v_L=K_L E_L$, where $E_L$ is the applied low electric field, and $K_L$ is the low-field mobility under the operating conditions. The distance traveled is $d_L=V_L t_L$ where $t_L$ is the duration of the low-field portion. As at the high electric field $E_H$ the mobility $K_H$ is not equal to the mobility $K_L$ at low electric field $E_L$, the ions experience a net displacement from their original position in the ion channel for a single cycle. If ion species respond differently to the high electric field, the ratio of $K_H$ to $K_L$ may be different for each ion species. Thus, the ions are separated according to their differential mobility.

According to the arrangement of the first electrode and the second electrode along the axis of the ion channel of the trapped ion mobility filter, according to the invention the ions experience a net displacement along the axis within the ion channel, due to the above described generated alternating axial electric field. This net displacement is referred to as differential mobility drift in the context of the disclosure.

Thus, a trapped ion mobility filter according to the invention is named as differential trapped ion mobility filter (dTIMF).

The present invention provides a differential trapped ion mobility separator which is operated as a differential mobility filter, by separating ions by their differential mobilities into those which pass the device for analysis and those which are held back in the filter region of the device by trapping. This effect is achieved by keeping the first axial force and the second axial force constant relative to each other, during the process of operating. Especially, the differential mobility filter can be operated as a low-pass differential mobility filter or as a high-pass differential mobility filter, respectively, dependent on the direction of the first axial force (and the second axial force). The differential filter can be operated as a high-pass differential mobility filter, when the differential mobility drift generated by the alternating axial electric field is directed downstream. In that case, the counteracting second axial force would have to be directed upstream. The differential filter can be operated as a low-pass differential mobility filter, when the differential mobility drift generated by the alternating axial electric field is directed upstream. In that case, the counteracting second axial force would have to be directed downstream. The trapped ion species can be periodically quenched (discarded) or released from the differential mobility filter by varying one of the counteracting forces in strength at specified times.

In comparison, in a differential trapped ion mobility separator not used as a mobility filter, but to trap and separate the entirety of introduced ion species according to differential mobility for analysis, one of the axial forces is increased relative to the other one, for eluting the trapped ions to be analyzed continuously or step-wisely. Thus, the main difference between a dTIMF, being a mobility filter, and a differential trapped ion mobility separator (dTIMS) not used as a mobility filter is the following: in a dTIMS not used as a mobility filter, ion species of interest are trapped and separated in space according to their differential mobility and are subsequently eluted over time according to their differential mobility, while in a dTIMF, being a mobility filter, only those ion species not of interest are trapped, while those ions of interest are transmitted directly and continuously. However, a separation of the ions according to their differential mobility will occur as well in a dTIMF, being a mobility filter, caused by the generated alternating axial electrical field.

Compared to prior art TIMS and methods, the dTIMF and method according to the present invention provide an additional tool for ion studies in a trapped ion mobility separator, since the change in ion mobility (differential mobility) is the crucial parameter, instead of the absolute ion mobility. This represents another dimension of separation for the ions in trapped ion mobility spectrometry. Compared to FAIMS, the here disclosed differential filter can be operated as a low-pass differential mobility filter or as a high-pass differential mobility filter, respectively, which allows to transmit ion species with a differential mobility below or above a limit value, whereas the FAIMS operates as a band pass filter, which only allows to transmit ion species within a small band of differential mobilities between an upper and a lower limit value. This represents a significant advantage in comparison to the FAIMS technique. Another advantage compared to FAIMS is, that using the FAIMS technique, all not transmitted ion species are filtered out and are discarded by discharging, whereas according to the invention, ion species not of interest are trapped, and can be used at a later point in time optionally.

Taking advantage of the different behavior of ion species in high and low electric fields, the dTIMS allows to filter the ion species substantially according to their charge stage because the differential mobility is often correlated to the charge state. Thus, the differential mobility filter can be operated as a low-pass charge state filter or as a high-pass charge state filter, respectively. In this way, ion species with a substantially defined charge state can be selected and/or discarded, in particular in view of optional subsequent analyses devices, for example a fragmentation cell. Being operated as high-pass charge state filter, for example, the differential mobility filter can substantially reduce singly charged ion species whereas multiply-charged ion species are predominately transmitted. This represents a distinct advantage with regard to its use in a hybrid mass spectrometric system, in particular, as fragment spectra of single charge ion species have no or little information.

It should be made clear that the generated alternating axial electric field, as it is used as first axial force according to the differential trapped ion mobility filter of this disclosure, distinguishes from a generated travelling wave field, as it can be used in a trapped ion mobility separator, in the following: With regard to the alternating axial electric field, at substantially any time, the direction of the first axial force does not change along the axis in the filter region of the disclosed trapped ion mobility filter. In contrast, with regard to the travelling wave field, a thereby caused axial force has a change of direction depending on the position of the "traveling wave" within a filter region.

Said first end of said ion channel can represent an entrance region for ions, to enter the ion channel. Said first end of said ion channel can be shaped tapered. In particular, said first end of said ion channel can comprise an ion funnel. In doing so, the ions can be focused when entering the ion channel. Said second end of said ion channel can represent an exit region for ions, to exit the ion channel. Said second end of said ion channel can be shaped tapered. In particular, said second end of said ion channel can comprise an ion funnel. In doing so, the ions can be focused when exiting the ion channel. Additionally, shaping said first end and said second end tapered, advantageously leads to the fact that the effect of electric fields inside the dTIMS on optionally upstream or downstream located devices can be minimized. It is also conceivable, that the first end of said ion channel can represent an entrance region for ions and an exit region for the ions at the same time.

One or more varying voltages can be applied to said first electrode and said second electrode at the same time. In particular, alternating separating voltages are applied to said first electrode and said second electrode to generate an alternating axial electric field. Further, compensation voltages can be applied to said first electrode and said second electrode to generate an electric compensation field. Further, confining voltages can be applied to said first electrode and said second electrode to generate an electric confining field to laterally confine the ions in said gas-filled ion channel.

Confining voltages can be radiofrequency (RF) voltages or a combination of RF voltages and direct current (DC) voltages.

Said first time interval can correspond to less than half of one period of said separating voltage to one-quarter of one period of said separating voltage. Said second time interval can correspond to more than half of one period of said separating voltage to three-quarters of one period of said separating voltage. Preferably said first time interval can correspond to one third of one period of said separating voltage and said second time interval can correspond to two thirds of one period of said separating voltage. Selecting these time intervals, a good resolution regarding separating the ions can be reached. In particular, said first time interval can last for about 3.33 us and said second time interval can last for about 6.66 μs.

Said separating voltage applied by said first generator can be applied so that the potential is 500 V to 1000 V in said first time interval and that the potential is −150 V to −450 V in said second time interval. Preferably, said separating voltage applied by said first generator can be applied so that the potential is 700 V in said first time interval and that the potential is-350 V in said second time interval. Thus, in the first time interval, an electric field can be generated whose field strength is high enough that the ion velocity is no longer directly proportional to the applied field and the mobility K is better represented by the low electric field constant mobility K(0) and field dependent terms $\alpha_i$ (see equation (1) above). In particular, in said first time interval a voltage of 350 V can be applied to said first electrode and a voltage of −350 V can be applied to said second electrode, and in said second time interval a voltage of −175 V can be applied to said first electrode and a voltage of 175 V can be applied to said second electrode. In general, the voltage between the first and the second electrode is preferably generated by applying two potentials of opposite sign to these electrodes. By keeping the absolute potentials on any given electrode as small as possible while simultaneously creating the largest potential difference possible across the analyzer, the ion separation can be maximized while simultaneously minimizing the risk of an electrical discharge between the electrodes or electrical elements. Alternatively, it is conceivable, that in said first time interval a voltage of 700 V can be applied to said first electrode and said second electrode has a potential of 0 V, or, in other words, said second electrode is maintained at ground potential, and in said second time interval a voltage of −350 V can be applied to said first electrode and said second electrode has a potential of 0 V, or, in other words, said second electrode is maintained at ground potential.

Selecting the above-mentioned preferred parameters concerning the duration of the first time interval (short time interval $t_H$) and the second time interval (long time interval $t_L$), and concerning the voltage level or the height of the potentials respectively (high voltage $V_H$ and low voltage $V_L$) ensures, that the integrated voltage-time product ($\int t \cdot V(t)dt$), and thus the field-time product, during each complete cycle is substantially zero. In particular, the above-mentioned preferred parameters substantially ensure that $(V_H\, t_H)+(V_L\, t_L)=0$, assuming that the electric field strength in the time intervals is constant.

However, it should be noted at this point that a combination of voltage and pressure constitutes the non-linear behavior in the drift velocity/mobility of the ions, Thus, even voltages in terms of amount lower than the above-mentioned voltages may be sufficient to cause this non-linear behavior of mobility, if there is a correspondingly adjusted pressure setting.

In a preferred embodiment said separating voltage is a substantially rectangular voltage. A substantially rectangular voltage offers the advantage, that in case of the change of the electric field the full field strength is present immediately. In an alternative embodiment, said separating voltage can be a substantially bi-sinusoidal voltage. It is also conceivable that said separating voltage can be a triangular voltage.

In another preferred embodiment said applied separating voltage has a frequency of 50 kHz to 2 MHz. Preferably said applied separating voltage has a frequency of 80 KHz to 120 KHz. Most preferably said applied separating voltage has a frequency of 100 KHz.

In another preferred embodiment the alternating axial electric field generated by said first generator has a maximum strength of 20 Td to 500 Td. In the context of the disclosure, this alternating axial electric field is also referred to as "electrical dispersion field". Td (townsend) is the unit of the ratio of the electric field strength and the gas particle density. Above an electric field strength to particle density ratio (E/N) of about 20 Td ($1\ Td=10^{-17}\ V\ cm^2$) the ion mobility has a considerable non-linear dependence on the electric field. An electric field strength to particle density ratio (E/N) of about 20 Td relates to an electric field strength of approximately 5000 V/cm at atmospheric pressure. Preferably the alternating axial electric field generated by said first generator has a strength of 150 Td to 250 Td. Most preferably the alternating axial electric field generated by said first generator has a strength of 200 Td.

Said second axial force can be caused in different ways. In a preferred embodiment said second axial force is caused by said second generator applying compensation voltages to said first electrode and said second electrode to generate an electrical compensation field. The generated electrical compensation field can be directed downstream—i.e., toward an exit end. Alternatively, the generated electrical compensation field can be directed upstream—i.e., toward an entrance end. Finally, the generated electrical compensation field has to be directed such, that the second axial force, which is represented by the electrical compensation field, counteracts the first axial force. Dependent on the direction of the electrical compensation field a movement of the ions is directed towards said first end or said second end of said ion channel. Preferably said second axial force is caused by said second generator applying electric DC voltages to said first and said second electrode to generate an axial direct current field (DC field). This gives the advantage over prior art TIMS, that the dTIMS can be operated with a gas at rest. This offers the additional advantage that expensive gases, like Helium, can also be used. In prior art TIMS analyzers a force on the ions is typically generated using a moving gas. However, a laminar flow of gas through the analyzer develops a parabolic flow profile. Thus, the flow, and the consequent force on the ions, near the lateral boundary of the analyzer will be lower than near the axis of the device. An advantage of using an electric DC field instead of a gas flow as second axial force is, that the DC field can be designed such that it is constant along lateral directions resulting in a laterally homogenous force on the ions and therefore homogeneous drifts across the whole inner width of the ion channel. Further, the lateral cross section and length of a TIMS will necessarily determine its gas conductivity. Thus, the lateral dimensions and length of a TIMS analyzer which uses an axial gas flow as the second axial force will be limited by the pumping speed of commercially reasonable pumps. The advantage of a dTIMS operated with a gas at rest is that a lateral extension of the device does not affect or limit its resolution.

In an alternative embodiment said second axial force is caused by said second generator applying transient electric DC voltages to said first and said second electrode to generate an axial transient electric DC field (also called as "travelling wave field").

It will be understood, however, by a person skilled in the art, that in the context of the invention in case two electric fields are generated as first and second axial force, in the aforementioned first generator and second generator can also be understood as a common electrical component with two different electrical units (representing the first and second generator), which generate the first and second axial force, respectively.

In yet another embodiment said second axial force is caused by said second generator generating an axial gas flow.

In another preferred embodiment said first generator and said second generator are configured such that at least one of the axial forces is changing in strength along said axis over time.

It is conceivable, that said first generator and said second generator are configured such that said first axial force or said second axial force of the counteracting forces are varied at periodic time intervals, to release trapped ions species from the differential mobility filter. Alternatively, the trapped ion species can be periodically quenched (discarded). Preferably, the inflow of ions is inhibited during that quench or release event.

In another preferred embodiment said first electrode and said second electrode are shaped and aligned so that said first electrode and said second electrode are enclosing said filter region within said ion channel perpendicular to said axis. In this way, the electrical field generated by supplying the electrodes with voltages is affecting the whole volume of the ion channel. This also advantageously results in confining the ions in the gas-filled ion channel or preventing the ions from escaping the ion channel laterally. Said first electrode can be assigned to said first end of said ion channel. Said second electrode can be assigned to said second end of said ion channel. Thus, the electrical field generated by supplying the electrodes with voltages is directed parallel to the longitudinal direction of the ion channel, such that the ions move along a desired direction, namely along the longitudinal direction between the first end and the second end of the ion channel.

In another preferred embodiment said ion channel comprises a plurality of additional electrodes of the same shape and alignment as said first electrode and said second electrode. Said additional electrodes are located along said axis within said ion channel between said first electrode and said second electrode. In this way it can be ensured that a stable, homogeneous electric field is available. Said additional electrodes can be arranged each about 1 mm apart from each other. At the same time or in an alternative embodiment, said additional electrodes can be connected by means of a resistor chain. In particular, all resistors can have the same resistance. In this way, a uniform division of the voltage is ensured. At the same time or in an alternative embodiment, said additional electrodes can be supplied with voltages using separate voltage generators. In this way, individual of the additional electrodes can be supplied with different voltages. Said additional electrodes can be arranged stacked (stacked electrodes). The alternating separating voltages to generate the alternating axial electric field can be applied to said additional electrodes. Further, the compensation voltages to generate the electric compensation field can be applied to said additional electrodes. Further RF voltages or a combination of RF—and DC voltages can be applied to said additional electrodes. The latter allows to confine the ions in the gas-filled ion channel.

In another preferred embodiment said ion channel has an elongated cross-sectional profile perpendicular to the axis with a first direction of extension and a second direction of extension. Thereby the first direction of extension is preferably longer than the second direction of extension. In a longitudinal direction (z) along said axis, said ion channel can have a dimension of 10 mm to 30 mm. Preferably said ion channel can have a dimension of 15 mm in said longitudinal direction along said axis. In a first lateral direction (x), which extends perpendicular to said longitudinal direction and represents said first direction of extension, said ion channel can have a dimension of 10 mm to 300 mm. Preferably in said first lateral direction said ion channel can have a dimension of 60 mm. In a second lateral direction (y), which extends perpendicular to said longitudinal direction and represents said second direction of extension, said ion channel can have a dimension of 5 mm to 10 mm. Preferably in said second lateral direction said ion channel can have a dimension of 8 mm. This laterally extended shaping enables in an advantageous way that ions do not have to be trapped along a line, but in an extended volume that is substantially elongated in one lateral direction. In this way, the charge capacity is significantly increased, compared to a device without laterally extended shaping, without restricting the mobility resolution. Further, this allows a high field strength in the longitudinal direction by applying reasonable voltages to the electrodes. Said ion channel can be shaped straight along the extended lateral dimension or curved.

In one embodiment, the ion channel can have an exterior wall. The exterior wall can represent an outer radius of the ion channel. Further, the ion channel can have an interior wall. The interior wall can represent an inner radius of the ion channel. Between the outer radius and the inner radius, a gap can be provided. The gap can represent an annulus, i.e., the difference between the outer radius and the inner radius (ring-shaped space). The annulus can have a dimension of 8 mm, which represents the thickness of the annulus. Ions can be radially confined within the annulus. Confining the ions within the annulus, provides an increased charge capacity.

In an alternative preferred embodiment said ion channel has a circular cross-sectional profile perpendicular to the longitudinal axis. Said circular cross-sectional profile can have a diameter of 2 mm to 10 mm. Preferably, said circular cross-sectional profile can have a diameter of 4 mm. In this embodiment, in a longitudinal direction (z) along said axis, said ion channel can have a dimension of 10 mm to 80 mm. Preferably said ion channel can have a dimension of 60 mm in said longitudinal direction along said axis.

In another preferred embodiment the trapped ion mobility filter is being coupled to a vacuum system that is designed and configured to operate the trapped ion mobility filter at a gas pressure in a range of 0.5 mbar to 20 mbar. Preferably the vacuum system is designed and configured to operate the trapped ion mobility filter at a gas pressure in a range of 2 mbar to 10 mbar. For this purpose, the vacuum system may comprise pumps. This pressure range allows a lateral ion confinement by using electric RF fields.

In another preferred embodiment the trapped ion mobility filter further comprises an ion trap. Said ion trap is located downstream of said filter region within said ion channel. Said ion trap can be located adjacent to said filter region. Said ion trap is set up for storing ions. Preferably, said ion trap can have substantially the same width as said filter region. Preferably, said ion trap can have substantially the same height as said filter region.

In another preferred embodiment said separating voltage applied by said first generator is applied so that the potential applied to said first electrode has opposite polarity to the potential applied to said second electrode.

The dTIMF can be operated as an individual device (or stand-alone device). Alternatively, it is conceivable that the dTIMF is coupled with other devices, such as a mass spectrometer (mass analyzer).

In a second aspect the invention provides a mass spectrometric system comprising an ion source, a mass analyzer with an ion detector, and at least a first trapped ion mobility filter located downstream of said ion source and/or upstream of said mass analyzer, wherein said first trapped ion mobility filter comprises an ion channel in which ions move along an axis between a first end of said ion channel, at which ions are introduced into said ion channel, and a second end of said ion channel, said ion channel containing a gas through which the ions pass, wherein the ion channel is supplied with radially confining voltages for preventing the ions from escaping the ion channel laterally, at least a first electrode and a second electrode arranged spaced apart from each other along said axis of said ion channel for defining an ion filter region therebetween, a first generator that causes a first axial force to be exerted on the ions along said axis by applying alternating separating voltages to said first electrode and said second electrode to generate an alternating axial electric field, the first axial force having an effect on the movement of the ions that is dependent on differential mobility by virtue of its interplay with said gas, wherein, at substantially any time, the direction of said first axial force does not change along said axis in said filter region, and wherein said alternating separating voltage is applied so that for a first time interval an electric field with a first field strength is generated, and for a second time interval, following said first time interval, an opposing electric field with a second field strength is generated, which is lower in magnitude than the first field strength, said first time interval lasting a shorter time span than said second time interval, a second generator that causes a second axial force to be exerted on the ions along said axis, which is counteracting said first axial force at least temporarily, further comprising an electrical controller which communicates with said first generator and said second generator to configure said first axial force and said second axial force such that ions with a first specific range of differential mobility are trapped within said filter region of said ion channel and ions with a second specific range of differential mobility, which is different from said first specific range of differential mobility, are transmitted through said ion channel.

Thus, the above-described trapped ion mobility filter can be part of a hybrid mass spectrometric system, comprising additionally at least an ion source upstream of said trapped ion mobility filter and a mass analyzer with an ion detector downstream of said trapped ion mobility filter. The above-described trapped ion mobility filter according to the invention is named as differential trapped ion mobility filter (dTIMF).

The ion source of the mass spectrometric system is set up to generate ions. For example, said ion source of the mass spectrometric system can generate ions using spray ionization (e.g., electrospray (ESI) or thermal spray). Alternatively, said ion source of the mass spectrometric system can generate ions using desorption ionization (e.g., matrix-assisted laser/desorption ionization (MALDI) or secondary ionization (SIMS)). In another alternative, said ion source of the mass spectrometric system can generate ions using chemical ionization (CI). In another alternative, said ion source of the mass spectrometric system can generate ions using photo-ionization (PI). In another alternative, said ion source of the mass spectrometric system can generate ions using electron impact ionization (EI). In another alternative, said ion source of the mass spectrometric system can generate ions using gas-discharge ionization.

The mass analyzer of the mass spectrometric system is set up to analyze ions according to their mass or more precisely mass to charge ratio. For example, said mass analyzer can be a time-of-flight analyzer. Preferably said mass analyzer can be a time-of-flight analyzer with orthogonal injection of ions. Alternatively, said mass analyzer can be an electrostatic ion trap of the Kingdon type, such as the Orbitrap® from Thermo. In another alternative, said mass analyzer can be an RF ion trap. In another alternative, said mass analyzer can be an ion cyclotron resonance (ICR)ion trap or a quadrupole mass filter.

In a preferred embodiment the mass spectrometric system further comprises a fragmentation cell. The fragmentation cell is set up to dissociate ions into fragment ions. Preferably, said fragmentation cell is located between said first trapped ion mobility filter and said mass analyzer. For example, the ions can be dissociated in said fragmentation cell by collision induced dissociation (CID). Alternatively, the ions can be dissociated in said fragmentation cell by surface induced dissociation (SID). In another alternative, the ions can be dissociated in said fragmentation cell by photo-dissociation (PD). In another alternative, the ions can be dissociated in said fragmentation cell by electron-induced dissociation, such as electron capture dissociation (ECD), electron transfer dissociation (ETD), collisional activation after electron transfer dissociation (ETcD), or activation concurrent with electron transfer dissociation (AI-ETD). In another alternative, the ions can be dissociated in said fragmentation cell by reactions with highly excited or radical neutral particles. Also conceivable is an embodiment with a further dTIMF, located downstream of the fragmentation cell. This could be beneficial to select fragment ions with a defined charge state, as the dTIMF allows to filter the ion species substantially according to their charge state because the differential mobility is correlated to the charge state.

In another preferred embodiment the mass spectrometric system further comprises a mass filter. Preferably, said mass filter is located between said first trapped ion mobility filter and said fragmentation cell.

In another preferred embodiment the mass spectrometric system further comprises a second ion mobility separator, preferably a trapped ion mobility separator. Preferably, said second ion mobility separator is located downstream of said first trapped ion mobility filter. Preferably, said second ion mobility separator is a trapped ion mobility separator constructed and operated to disperse ion according to ion mobility, preferably in the low field limit. A system comprising a first differential TIMF coupled with a TIMS constructed and operated to disperse ion according to ion mobility, preferably in the low field limit, can be termed as tandem dTIMF/TIMS.

In another preferred embodiment the mass spectrometric system further comprises a first housing assigned to the first trapped ion mobility filter. In particular, the first housing may enclose the first trapped ion mobility filter. Additionally, the mass spectrometric system comprises a second housing assigned to the second ion mobility separator. In particular, the second housing may enclose the second ion mobility separator. The first housing and the second housing may represent a vacuum chamber each. The first housing and the second housing may contain a gas (drift gas) each. The gas assigned to the first housing (and thus to the first trapped ion mobility filter) can differ from the gas assigned to the second housing (and thus to the second ion mobility separator). In particular, the gas assigned to the first housing and the first ion mobility filter may be a gas different from the gas assigned to the second housing and the second ion mobility separator. For example, the gases used may be one of $H_2$, He, Ar, $N_2$, $CO_2$ or mixtures of these gases. The use of other gases or mixtures of or with any other gases than those mentioned above is conceivable. Optionally, modifiers may be introduced into the gas. Modifiers may include acetonitrile, methanol, small hydrocarbons, $SF_6$, or any other vapor. Using different gases within the first and second housing enables in an advantageous way, that ions which may not be sufficiently separated within the first ion mobility filter may be separated within the second ion mobility separator, as the type of gas has an effect on the drift velocity of the ions. It should be noted, that even if the ion mobility separator/filter is operated with a gas at rest (this is the case when both, the first and the second axial force, are generated by electric fields) a low gas flow is present. However, this low gas flow only serves to separate the gas atmosphere within the housings.

In another preferred embodiment, the mass spectrometric system further comprises at least one ion trap. The ion trap is set up to store ions. Preferably, the ion trap is located between said first trapped ion mobility filter and said second ion mobility separator.

Furthermore, the mass spectrometric system can comprise a separation device. Said separation device can be a gas chromatography device. Alternatively, said separation device can be a liquid chromatography device. It is also conceivable, that the mass spectrometric system further comprises an electrophoretic device. Alternatively, an electrophoretic device can be coupled to the hybrid mass spectrometric system.

The preferred embodiments described for the aforementioned trapped ion mobility filter according to the invention are also preferred embodiments of the mass spectrometric system. The preferred embodiments for the mass spectrometric system, which refer to the trapped ion mobility filter are also preferred embodiments of the aforementioned trapped ion mobility filter.

In a third aspect the invention provides a method for analyzing ions, using a first trapped ion mobility filter. Preferably the method is performed in a mass spectrometric system. The method comprises the steps of:

providing an ion channel in which ions move along an axis between a first end of said ion channel, at which ions are introduced into said ion channel, and a second end of said ion channel, said ion channel containing a gas through which the ions pass, wherein the ion channel is supplied with radially confining voltages for preventing the ions from escaping the ion channel laterally, providing at least a first electrode and a second electrode arranged spaced apart from each other along said axis of said ion channel for defining an ion filter region therebetween, generating a first axial force that is imparted to the ions along said axis by applying alternating separating voltages to said first electrode and said second electrode to generate an alternating axial electric field, the first axial force having an effect on the movement of the ions that is dependent on differential mobility by virtue of its interplay with said gas, wherein, at substantially any time, the direction of said first axial force does not change along said axis in said filter region, applying said alternating separating voltage so that for a first time interval an electric field with a first field strength is generated, and for a second time interval, following said first time interval, an opposing electric field with a second field strength is generated, which is lower in magnitude than the first field strength, said first time interval lasting a shorter time span than said second time interval, generating a second axial force that is imparted to the ions along said axis and that counteracts said first axial force at least temporarily, configuring said first axial force and said second axial force such that ions with a first specific range of differential mobility are trapped within said filter region of said ion channel and ions with a second specific range of differential mobility, which is different from said first specific range of differential mobility, are transmitted through said ion channel.

The aforementioned trapped ion mobility filter according to the invention is named as differential trapped ion mobility filter (dTIMF).

The method for analyzing ions comprises the step of introducing the ions into the ion channel at the first end of the ion channel. Introducing the ions into the ion channel at the first end of the ion channel has to be understood as introducing the ions along said axis of the ion channel along which the ions move between the first end and the second end of the ion channel. In particular, that means, the ions are introduced along the axis, along which they are separated. Introducing ions into the ion channel may be understood as injecting or inserting or inputting ions into the ion channel.

Said first time interval can correspond to less than half of one period of said separating voltage to one-quarter of one period of said separating voltage and said second time interval can correspond to more than half of one period of said separating voltage to three-quarters of one period of said separating voltage. Preferably said first time interval can correspond to one third of one period of said separating voltage and said second time interval can correspond to two thirds of one period of said separating voltage. Selecting these time intervals, a good resolution regarding separating the ions can be reached. In particular, said first time interval can last for about 3.33 us and said second time interval can last for about 6.66 μs.

In a preferred embodiment the method for analyzing ions further comprises the step of generating the alternating axial electric field with a maximum strength of 20 Td to 500 Td, preferably of 150 Td to 250 Td, most preferably of 200 Td. Preferably the alternating axial electric field is generated with a strength of 150 Td to 250 Td. Most preferably the alternating axial electric field is generated with a strength of 200 Td. Preferably, a first generator can be used to generate the alternating axial electric field.

A first generator can apply said separating voltage so that the potential is 500 V to 1000 V in said first time interval and that the potential is −150 V to −450 V in said second time interval. Preferably, a first generator can apply said separating voltage so that the potential is 700 V in said first time interval and that the potential is-350 V in said second time interval. Thus, in the first time interval, an electric field can be generated whose field strength is high enough, that the ion velocity is no longer directly proportional to the applied field and the mobility K is better represented by the low electric field constant mobility K(0) and field dependent terms $\alpha_i$ (see equation (1) above). In particular, in said first time interval a voltage of 350 V can be applied to said first electrode and a voltage of −350 V can be applied to said second electrode. In particular, in said second time interval a voltage of −175 V can be applied to said first electrode and a voltage of 175 V can be applied to said second electrode. In general, the voltage between the first and the second electrode is preferably generated by applying two potentials of opposite sign to these electrodes. By keeping the absolute potentials on any given electrode as small as possible while simultaneously creating the largest potential difference possible across the analyzer, the ion separation can be maximized while simultaneously minimizing the risk of an electrical discharge between the electrodes or electrical elements. Alternatively, it is conceivable, that in said first time interval a voltage of 700 V can be applied to said first electrode and said second electrode has a potential of 0 V or, in other words, said second electrode is maintained at ground potential, and in said second time interval a voltage of −350 V can be applied to said first electrode and said second electrode has a potential of 0 V or, in other words, said second electrode is maintained at ground potential.

However, it should be noted at this point that a combination of voltage and pressure constitutes the non-linear behavior in the drift velocity/mobility of the ions. Thus, even voltages in terms of amount lower than the above-mentioned voltages may be sufficient to cause this non-linear behavior, if there is a correspondingly adjusted pressure setting.

In another preferred embodiment the method for analyzing ions further comprises the step of changing at least one of the axial forces in strength along said axis.

In another preferred embodiment the method for analyzing ions further comprises the step of analyzing separated ions as a function of mobility in a second ion mobility separator. Preferably said second ion mobility separator is a trapped ion mobility separator, constructed and operated to disperse ions according to ion mobility, preferably in the low field limit. Preferably said second trapped ion mobility separator is located downstream of said first trapped ion mobility filter.

In another preferred embodiment the method for analyzing ions further comprises the step of analyzing separated ions as a function of mass in a mass analyzer. Said mass analyzer is located downstream of said second ion mobility separator constructed and operated to disperse ions according to ion mobility.

In another preferred embodiment the method for analyzing ions further comprises the step of dissociating filtered and/or separated ions into fragment ions and analyzing said fragment ions in a mass analyzer. Preferably, the ions are dissociated in a fragmentation cell. Preferably, said fragmentation cell and said mass analyzer are located downstream of said first trapped ion mobility filter. In another embodiment in which a second ion mobility separator, constructed and operated to disperse ions according to ion mobility, preferably in the low field limit, is provided, which is located downstream of said first trapped ion mobility filter, said fragmentation cell and said mass analyzer are preferably located downstream of said second ion mobility separator.

In another preferred embodiment the method for analyzing ions further comprises the step of selecting and/or filtering the filtered and/or separated ions according to mass prior to fragmentation. Additionally, or in an alternative embodiment, the method for analyzing ions further comprises the step of selecting and/or filtering the filtered and/or separated ions according to their charge state prior to fragmentation.

Preferred embodiments described for the aforementioned trapped ion mobility filter or preferred embodiments described for the aforementioned mass spectrometric system are also preferred embodiments of the method for analyzing ions.

BRIEF DESCRIPTION OF THE DRAWINGS

The invention can be better understood by referring to the following figures. The elements in the figures are not necessarily to scale, emphasis instead being placed upon illustrating the principles of the invention (often schematically).

DETAILED DESCRIPTION

While the invention has been shown and described with reference to a number of different embodiments thereof, it will be recognized by those skilled in the art that various changes in form and detail may be made herein without departing from the scope of the invention as defined by the appended claims.

Figure 1A:
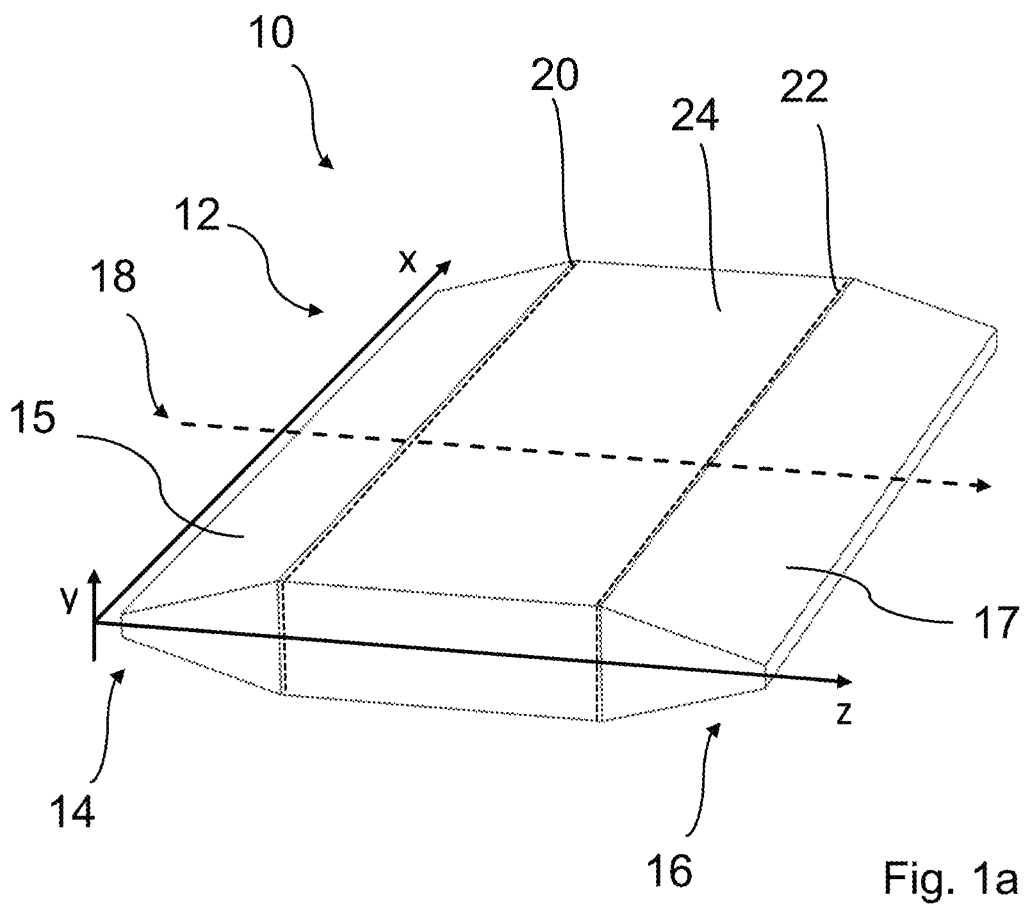
FIG. 1*a* is a first schematic perspective view of a trapped ion mobility separator.
Figure 1B:
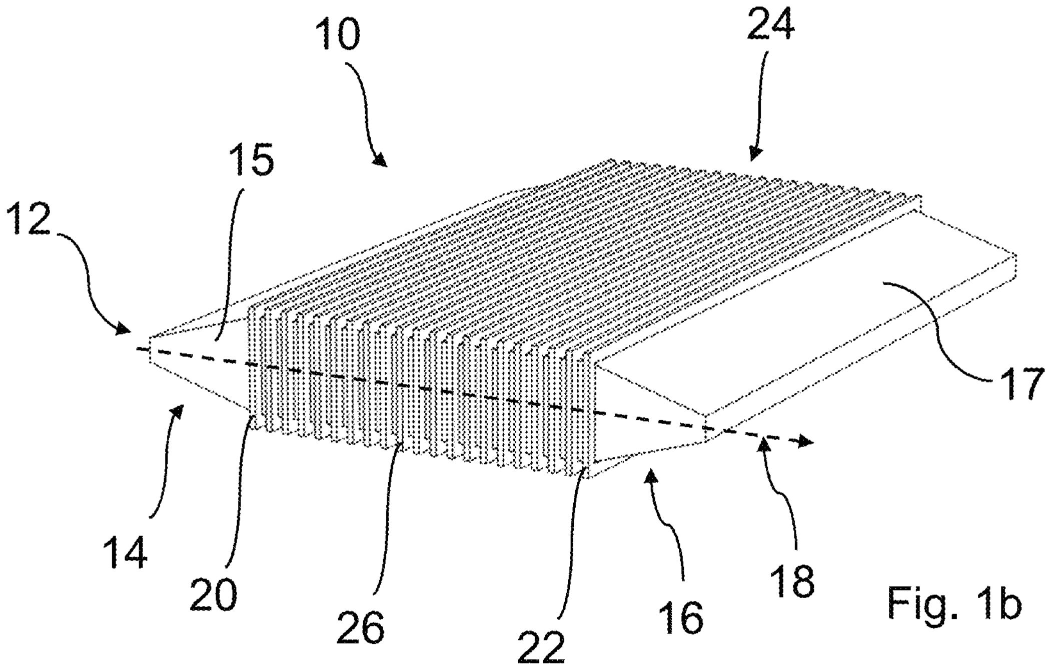
FIG. 1*b* is a second schematic perspective view of the trapped ion mobility separator of FIG. 1*a*.

FIGS. 1*a* and 1*b* show schematic perspective views of a trapped ion mobility separator 10. The trapped ion mobility separator 10 is used to trap and separate ions according to their differential mobility, representing an optional way of operating a differential trapped ion mobility separator. The trapped ion mobility separator 10 is not operated as being a differential mobility filter and is thus not an embodiment of the invention. However, as the trapped ion mobility separator 10 uses an alternating axial electric field as a first axial force, which is generated in the same way as disclosed for the invention, it should be used to explain by way of comparison the way of operating a differential trapped ion mobility separator.

The trapped ion mobility separator 10 comprises an ion channel 12. The ion channel 12 has a first end 14. Further, the ion channel 12 has a second end 16, facing away from the first end 14. In the embodiment example, the first end 14 and the second end 16 are tapered shaped. Ions (not shown in the figures), which can be provided by an external ion source 112 (FIG. 8), can move through the ion channel 12 along an axis 18, which is represented by a dashed line in the figure, between the first end 14 and the second end 16 of the ion channel 12. In the embodiment example, the first end 14 represents an entrance region 15 for the ions. In particular, in the embodiment example, the entrance region 15 is an entrance funnel. The second end 16 represents an exit region 17 for the ions in the embodiment example. In particular, in the embodiment example, the exit region 17 is an exit funnel. The ion channel 12 contains a gas, through which the ions pass.

The trapped ion mobility separator 10 comprises a first electrode 20, which is represented by a dashed line in the FIG. 1*a*. Further, the ion channel 12 comprises a second electrode 22, which is represented by a dashed line in the FIG. 1*a*. The first electrode 20 and the second electrode 22 are arranged spaced apart from each other along the axis 18 within the ion channel 12 for defining an ion separation region 24 therebetween. The first electrode 20 is shaped and aligned so that the first electrode 20 encloses the separation region 24 within the ion channel 12 perpendicular to the axis 18. The second electrode 22 is shaped and aligned so that the second electrode 22 encloses the separation region 24 within the ion channel 12 perpendicular to the axis 18.

The trapped ion mobility separator 10 comprises a plurality of additional electrodes 26 (FIG. 1*b*). In the embodiment example, the ion channel 12 comprises nineteen additional electrodes 26, all of them provided with the same reference sign. The additional electrodes 26 have the same shape and alignment as the first electrode 20 and the second electrode 22. The additional electrodes 26 are located along the axis 18 at said ion channel 12 between the first electrode 20 and the second electrode 22. In particular, the additional electrodes 26 are spaced about 1 mm from each other and from the first electrode 20 and the second electrode 22, respectively. The additional electrodes 26 are connected by means of a resistor chain (not shown in the figure). The additional electrodes 26 are supplied with RF confining voltages to prevent the ions from escaping the ion channel 12 laterally, i.e., along the x and y directions. The first electrode 20, the second electrode 22 and the additional electrodes 26 together define the ion channel 12.

The trapped ion mobility separator 10 comprises a first generator (not shown in the figure). The first generator causes a first axial force to be exerted on the ions along the axis 18. To cause the first axial force the first generator applies alternating separating voltages to the first electrode 20 and the second electrode 22, which generate an alternating axial electric field. The first axial force has an effect on the movement of the ions that is dependent on differential mobility by virtue of its interplay with the gas. Further, the trapped ion mobility separator 10 comprises a second generator (not shown in the figure). The second generator causes a second axial force to be exerted on the ions along the axis 18. In the embodiment, to cause the second axial force the second generator applies electric direct current (DC) voltages to the first electrode 20 and the second electrode 22, which generate an axial direct current field (DC field). The second axial force is counteracting the first axial force. In particular, the second axial force is counteracting the first axial force temporarily.

Further, the trapped ion mobility separator 10 comprises an electrical controller (not shown in the figure). The electrical controller communicates with the first generator and the second generator. The electrical controller is set up to vary at least one of the first axial force and the second axial force over time.

In the embodiment example, the ion channel 12 has an elongate cross-sectional profile perpendicular to the axis 18, with a first dimension and a second dimension. In particular, the first dimension is longer than the second dimension. In the embodiment example, the ion channel 12 has the following dimensions: Along a longitudinal direction (z) along the axis 18 the ion channel 12 has a dimension of about 20 mm; in a first lateral direction (x), which extends perpendicular to the longitudinal direction (z) the ion channel 12 has a dimension of 60 mm; and in a second lateral direction (y), which also extends perpendicular to the longitudinal direction (z) the ion channel 12 has a dimension of 8 mm. That means, in the embodiment example, the extend of the ion channel 12 is much greater in one of the lateral directions than in the longitudinal direction, along which the ions move. For a better spatial assignment of the above described extension directions, a coordinate system is drawn in the FIG. 1*a*.

In the following, the mode of operation of the trapped ion mobility separator 10 according to the optional way of operating a differential trapped ion mobility separator is described:

Ions are introduced to the ion channel 12. In particular, the ions are introduced to the ion channel 12 at the first end 14 (representing the entrance region 15) of the ion channel 12. Thus, the ions are introduced (injected)into the ion channel 12 along the axis 18, along which they move between the first end 14 and the second end 16. In particular, that means, the ions are injected along that axis, along which they will be separated. Subsequently, the ions are guided to the separation region 24. The first axial force, that is imparted to the ions along the axis 18, is generated by the first generator, by applying alternating separating voltages to the first electrode 20 and the second electrode 22 to generate an alternating axial electric field. In the embodiment example, in the first time interval the generated alternating axial electric field is directed downstream in the separation region 24. In the second time interval the generated alternating axial electric field is directed upstream in the separation region 24. As the second time interval lasts longer than the first time interval, in total, the generated alternating axial electric field generates an upstream directed differential mobility drift within the separation region 24, or in other words, in total, the ions experience a net displacement towards the first end 14 of the ion channel 12. That means, in total, the first axial force leads to a movement of the ions towards the first end 14 of the ion channel 12. At substantially any time, the direction of the first axial force does not change along the axis 18 in the separation region 24. The potentials of the first electrode 20 and the second electrode 22 are distributed to the additional electrodes 26 via the resistor chain.

At the same time, the second axial force, that is imparted to the ions along the axis 18 and that counteracts the first axial force temporarily, is generated by the second generator, by applying compensation voltages to the first electrode 20 and the second electrode 22 to generate an electric compensation field. In particular, in the embodiment example, the second generator applies electric DC voltages to the first electrode 20 and the second electrode 22 to generate an axial direct current field (DC field). In the embodiment example, the generated axial DC field is directed downstream. That means, the generated axial DC field generates a downstream mobility drift (DC field drift), or in other words, the movement of the ions caused by the axial DC field is directed towards the second end 16 of the ion channel 12. The compensation potentials of the first electrode 20 and the second electrode 22 are distributed to the additional electrodes 26 via the resistor chain.

At the same time, radially confining RF voltages are applied to the first electrode 20, the second electrode 22 and the additional electrodes 26 for preventing the ions from escaping the ion channel 12 laterally.

The alternating separating voltages, applied by the first generator are applied so that for a first time interval an electric field with a first field strength is generated, and for a second time interval, following the first time interval, an opposing electric field with a second field strength is generated. Thereby, the second field strength is lower in magnitude than the first field strength. The first time interval lasts a shorter time span than the second time interval, such that the ions are trapped and separated along the axis 18 by a force equilibrium of the first axial force and the second axial force.

In the embodiment example, the first time interval corresponds to one third of one period of the alternating separating voltage and the second time interval corresponds to two thirds of one period of the alternating separating voltage. In particular, the first time interval lasts for about 3.33 μs and the second time interval lasts for about 6.66 μs.

In the embodiment example, in the first time interval the first generator applies the alternating separating voltage so that the potential difference between the first and second electrode (voltage) is 700 V. In the second time interval, the first generator applies the alternating separating voltage so that the potential difference is −350 V. In particular, in the first time interval a voltage of 350 V is applied to the first electrode 20 and a voltage of −350 V is applied to the second electrode 22. In particular, in the second time interval a voltage of −175 V is applied to the first electrode and a voltage of 175 V is applied to the second electrode.

In the embodiment example, a rectangular voltage is applied as separating voltage. Further, in the embodiment example, the applied alternating separating voltage has a frequency of 100 kHz. In the embodiment example, the alternating axial electric field generated by the first generator has a strength of 200 Td, thus representing an electric field strength to particle density ratio at which the ion mobility has a considerable non-linear dependence on the electric field.

Thus, in the embodiment example, the first axial force effects a movement of the ions which is dependent on the differential mobility of the ions, while the second axial force effects a movement of the ions which is dependent on the mobility of the ions. It should be mentioned at this point that, for example, a gas flow would cause a movement of the ions that does not depend on the mobility of the ions (or in other words, a velocity of the movement of the ions caused by the gas flow does not depend on the mobility of the ions).

At least one of the first axial force and the second axial force is varied over time by the electric controller. In the embodiment example, the first axial force or the second axial force is varied such that the second axial force is increased relative to the first axial force. In the embodiment example, the second axial force is increased in a few steps. By doing this, the trapped ions are driven progressively to the second end 16 of the ion channel 12, representing the exit region 17, as a function of their differential mobility. Thus, the ions elute in fractions, each comprising a range of ion species with different differential mobilities.

In the embodiment example, the trapped ion mobility separator 10 is operated at a gas pressure of 5 mbar.

Figure 2:
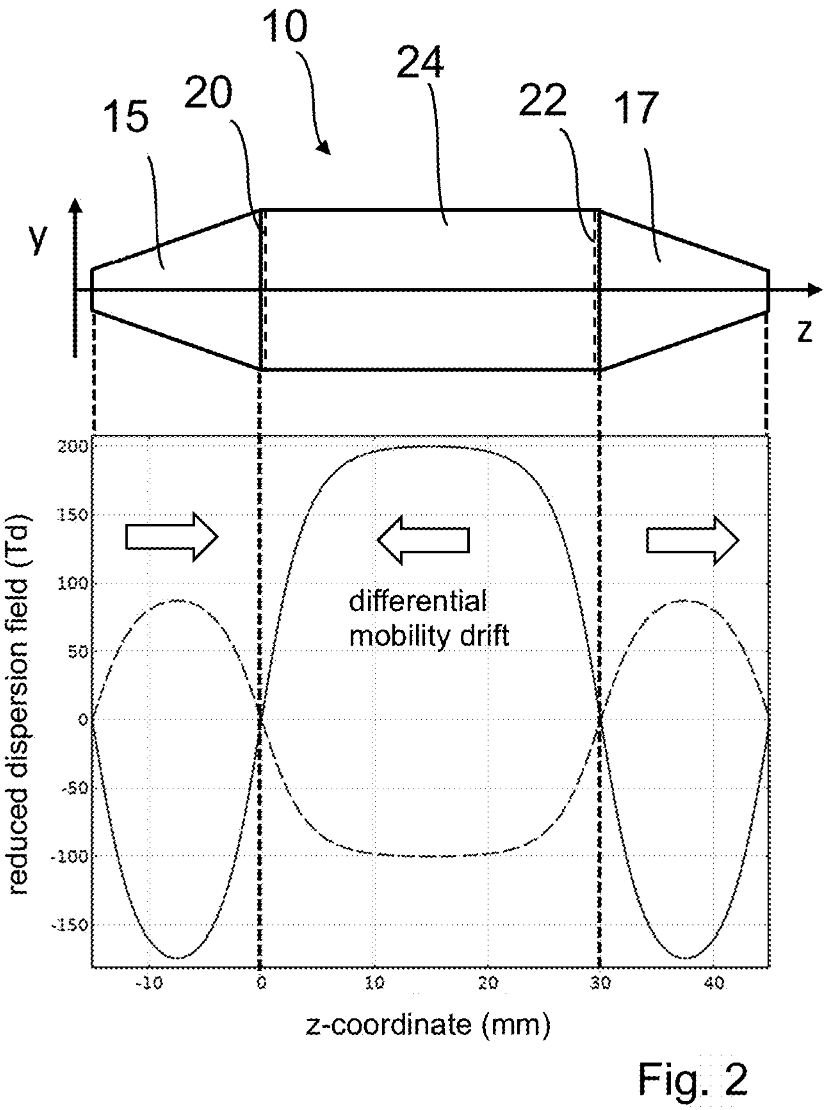
FIG. 2 presents a profile of the dispersion field along the longitudinal direction of the ion channel, as it is generated in the trapped ion mobility separator of FIGS. 1*a* and 1*b*.

FIG. 2 presents a profile of the reduced dispersion field along the longitudinal direction (z) of the ion channel 12, as it is generated in the trapped ion mobility separator 10 of FIG. 1. Principally, the dispersion field is the spatial derivation of the dispersion potential. In the context of this disclosure, the term "dispersion field" shall represent the above-described alternating axial electric field. Thus, this reduced dispersion field corresponds to the first axial force. For better overview, a geometric longitudinal section view of the ion channel 12 along the axis 18 (y-z view) is illustrated on top of the profile, beginning at the first end 14 of the ion channel 12 and ending at the second end 16 of the ion channel 12, and presenting the positions of the first electrode 20 and the second electrode 22 at the ion channel 12.

On the ordinate the reduced dispersion field (Td) is shown, and on the abscissa the z-coordinate (mm), representing the extension of the ion channel 12 in the longitudinal direction, is shown. The alternating separating voltages applied to the first electrode 20 and to the second electrode 22 generate a dispersion field Ed during the first time interval and the second time interval. The reduced dispersion field (Td) describes the ratio of electric field strength and particle density. The solid drawn line represents the reduced dispersion field (Td) during the first time interval, and the dashed line represents the reduced dispersion field (Td) during the second time interval. Actually, the second time interval follows on the first time interval. However, as the applied reduced field for both time intervals are plotted simultaneous in the figure, or in other words time independent, the unit of the ordinate is termed as "reduced dispersion field" instead of "reduced field". Further, the mobility drift of the ions, resulting from the alternating electric field, is displayed in the figure.

As can be seen in the figure, the time-dependent dispersion field causes different differential mobility drifts (represented by arrows) within the separation region 24 of the ion channel 12 and within the entrance region 15 or within the exit region 17 of the ion channel 12. The differential mobility drift within the separation region 24 is directed upstream. The differential drifts within the entrance region 15 and within the exit region 17 are directed downstream.

The differential mobility drift velocity depends in a nonlinear way on the strength of the dispersion field Ed. In the transition between the entrance region 15 of the ion channel 12 and the separation region 24 of the ion channel, the differential mobility drift velocity exhibits a gradient which is used for the spatial separation and trapping of the ions.

Figure 3:
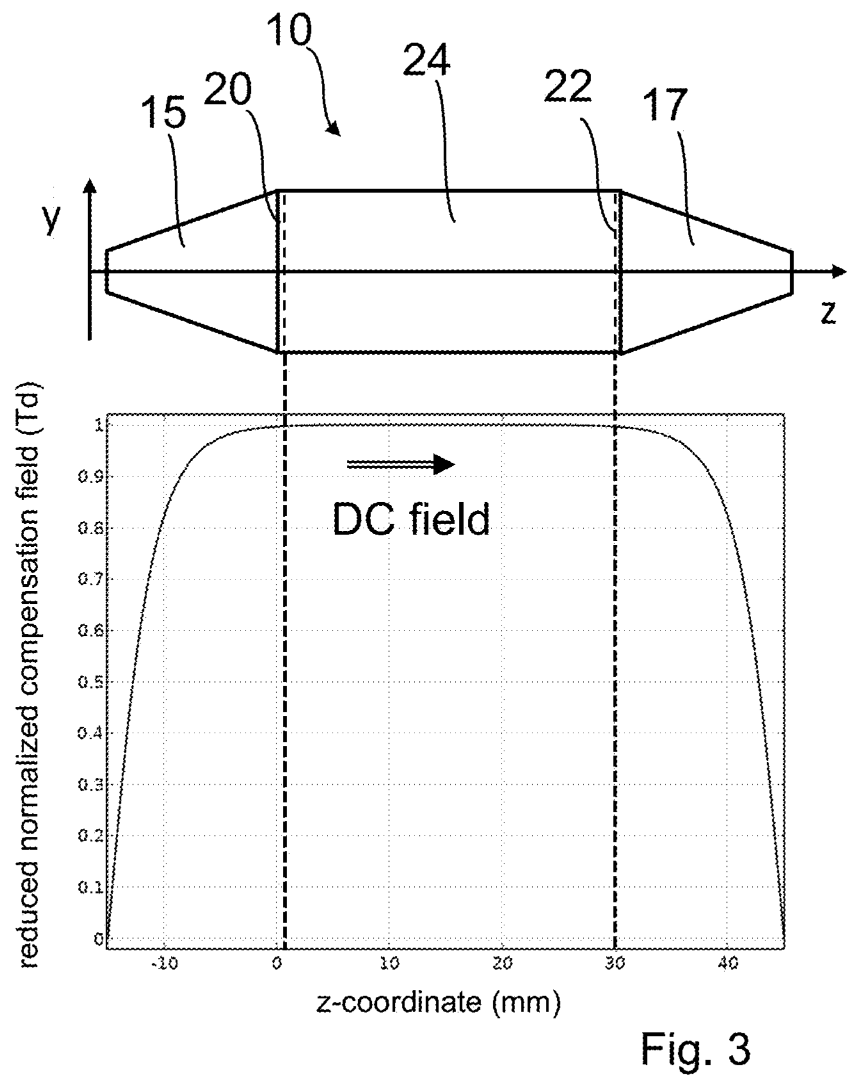
FIG. 3 presents a profile of the normalized compensation field along the longitudinal direction of the ion channel, as it is generated in the trapped ion mobility separator of FIGS. 1*a* and 1*b*.

The dispersion field Ed is spatially constant in the middle of the separation region 24 of the ion channel 12, which forms a kind of plateau region of the "differential mobility barrier". The first axial force (dispersion field, differential mobility drift velocity) rises from the first electrode 20 to a plateau region between the first electrode 20 and the second electrode 22 (FIG. 2). The second force (compensation field) is spatially uniform between the first electrode 20 and the second electrode 22 (FIG. 3). The differential mobility drift and the DC drift move the ions towards the first electrode 20. An ion species gets trapped at a position downstream of the first electrode 20 where the differential mobility drift velocity equals the DC field drift velocity.

FIG. 3 presents a profile of the normalized compensation field along the longitudinal direction (z) of the ion channel 12, as it is generated in the trapped ion mobility separator 10 of FIG. 1. This normalized compensation field corresponds to the second axial force. Again, for better overview, a geometric longitudinal section view of the ion channel 12 along the axis 18 (y-z view) is illustrated on top of the profile, beginning at the first end 14 of the ion channel 12 and ending at the second end 16 of the ion channel 12, and presenting the positions of the first electrode 20 and the second electrode 22 at the ion channel 12.

On the ordinate the normalized reduced compensation field (Td) is shown, and on the abscissa, the z-coordinate (mm), representing the extension of the ion channel 12 in the longitudinal direction, is shown. The compensation voltages applied to the first electrode 20 and to the second electrode 22 generate a compensation field Ec. The reduced compensation field (Td) describes the ratio of electric compensation field strength and particle density. Here, the reduced dispersion field is normalized to 1 Td. In the embodiment example, the normalized reduced compensation field (Td) is a normalized reduced axial direct current field.

As can be seen in the figure, the compensation field or the normalized reduced compensation field is spatially constant. Further, the compensation field or the normalized reduced compensation field generates a downstream axial direct current field drift (represented by an arrow). This axial direct current field drift counteracts the upstream differential mobility drift (FIG. 2) generated by the dispersion field Ed.

Figure 4A:
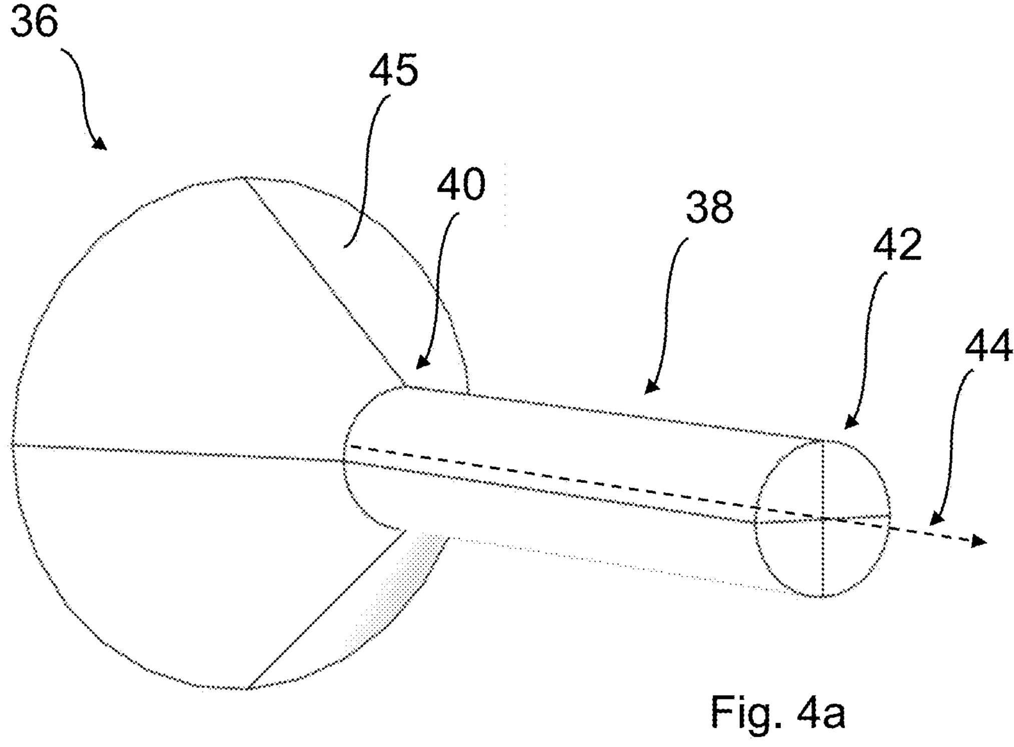
FIG. 4*a* shows a first schematic perspective view of a first embodiment of a trapped ion mobility filter according to the invention.
Figure 4B:
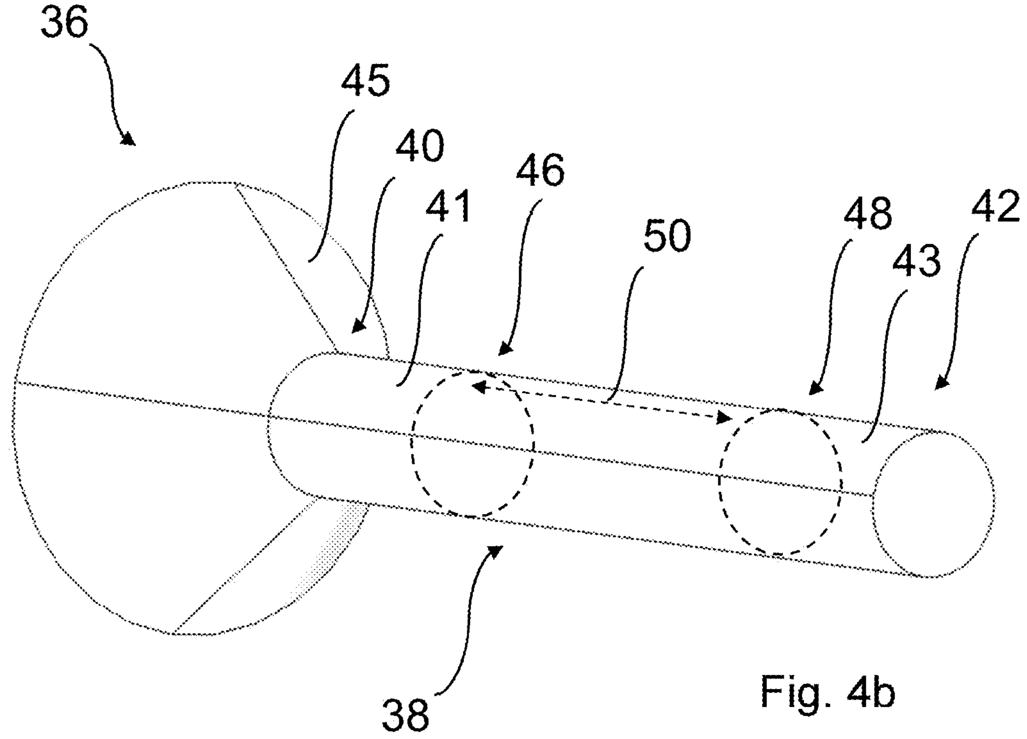
FIG. 4*b* shows a second schematic perspective view of first embodiment of the trapped ion mobility filter according to the invention.
Figure 4C:
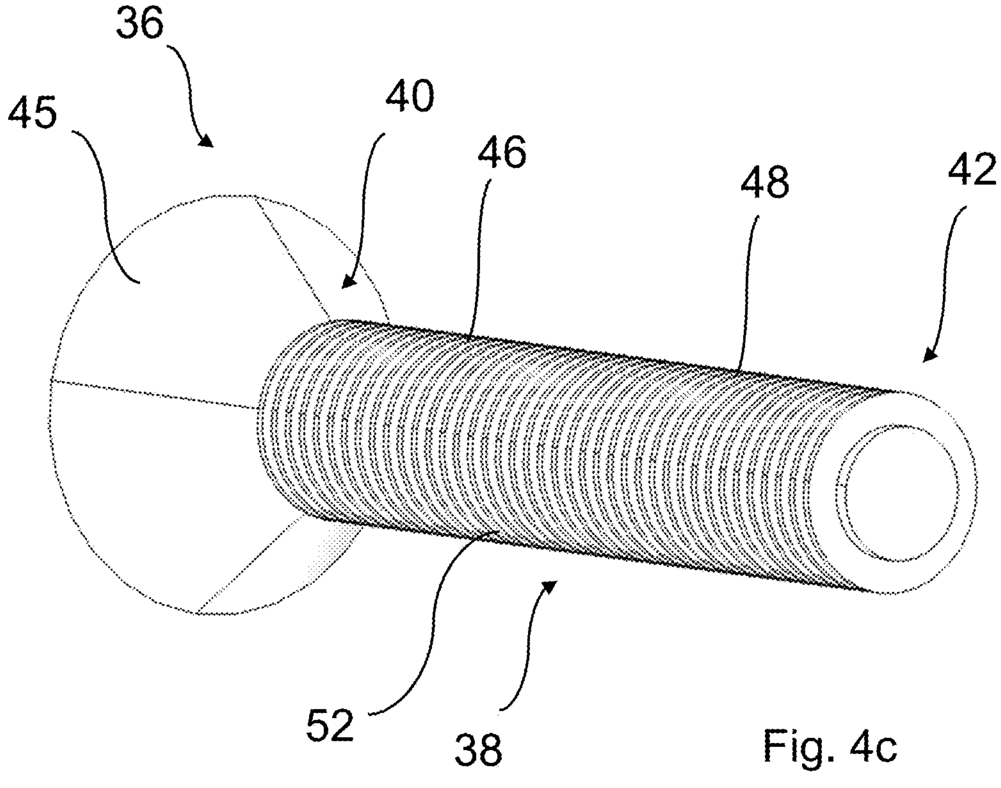
FIG. 4*c* shows a third schematic perspective view of the first embodiment of the trapped ion mobility filter according to the invention.
Figure 4D:
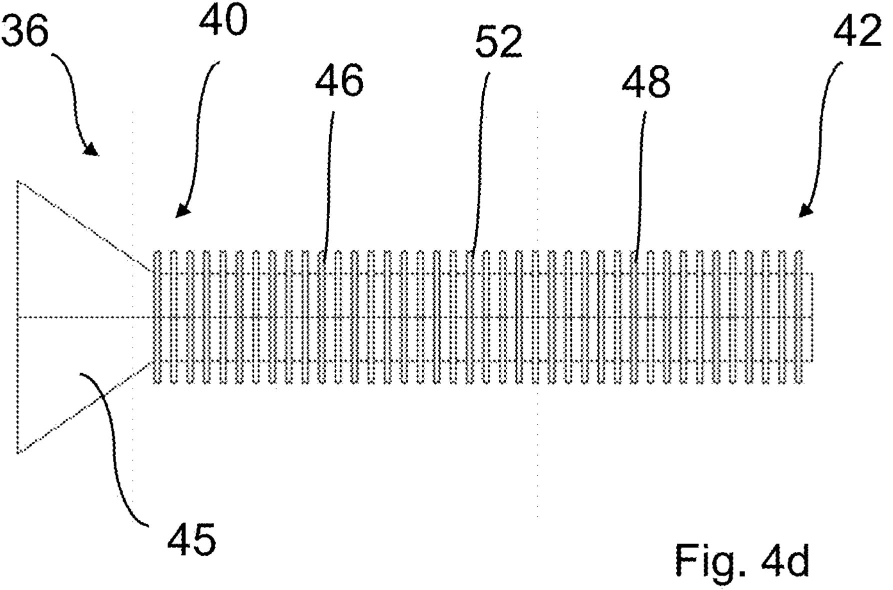
FIG. 4*d* shows a schematical longitudinal sectional view of the first embodiment of the trapped ion mobility filter according to the invention.
Figure 8:
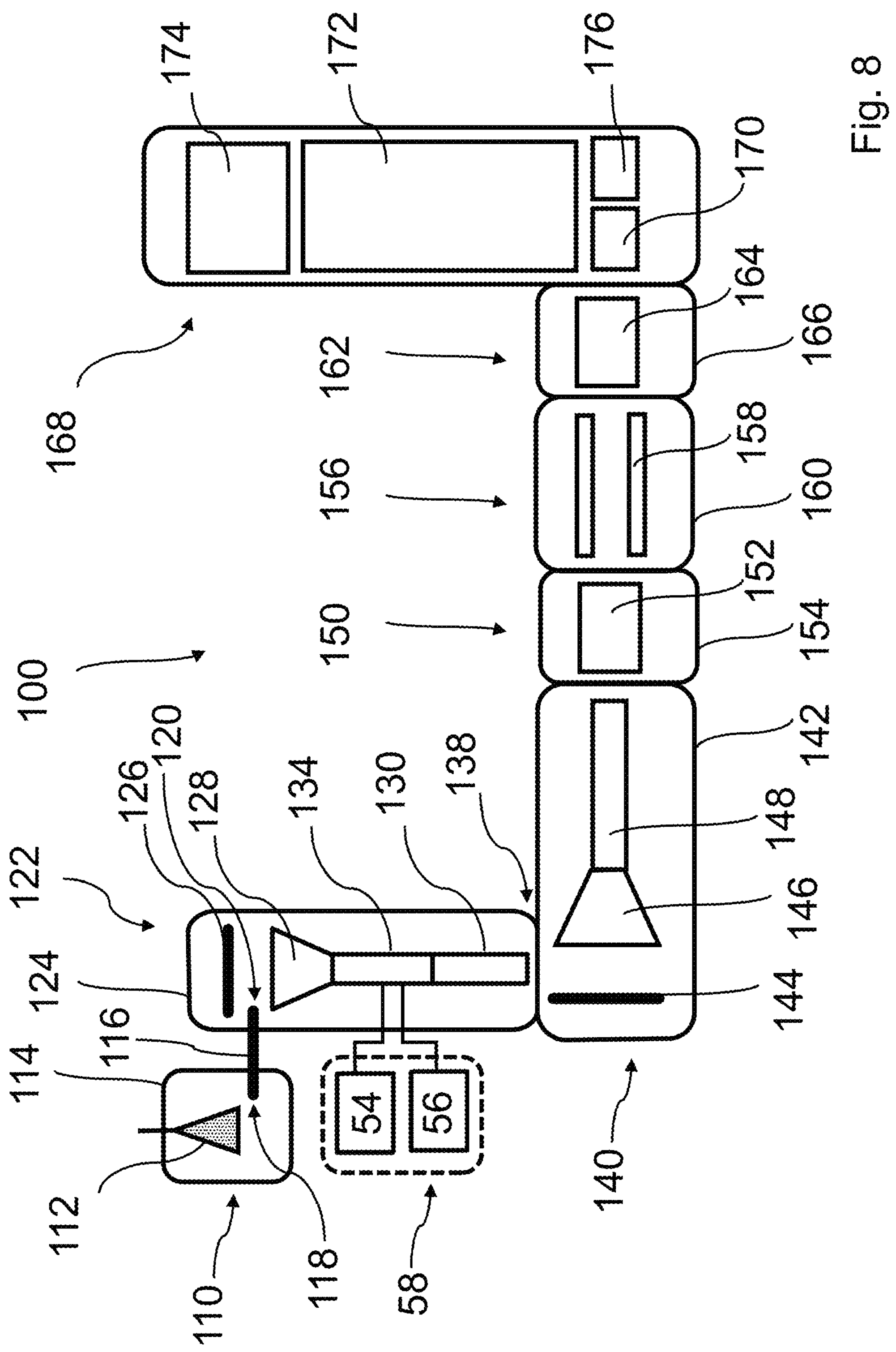
FIG. 8 shows a schematic diagram of a mass spectrometric system according to the invention.

FIGS. 4*a*-4*c* show schematic perspective views of a first embodiment of a trapped ion mobility filter 36 according to the invention, and FIG. 4*d* shows a schematical longitudinal sectional view of the first embodiment of the trapped ion mobility filter 36 according to the invention. The trapped ion mobility filter 36 is a differential trapped ion mobility filter (dTIMF). In particular, in the embodiment example, the trapped ion mobility filter 36 is operated as a high-pass differential mobility filter. According to the invention, that high-pass differential mobility filter also functions as a high-pass charge state filter, which can substantially reduce singly charged ion species whereas multiply-charged ion species are predominately transmitted. However, alternatively, the trapped ion mobility filter 36 could be operated as a low-pass differential mobility filter, which would also function as a low-pass charge state filter. The trapped ion mobility filter 36 may be part of a mass spectroscopic system 100 (FIG. 8).

The trapped ion mobility filter 36 comprises an ion channel 38. The ion channel 38 has a first end 40. Further, the ion channel 38 has a second end 42, facing away from the first end 40. Ions (not shown in the figures), which can be provided by an external ion source 112 (FIG. 8), can move through the ion channel 38 along an axis 44, which is represented by a dashed line in the figure, between the first end 40 and the second end 42 of the ion channel 38. In the embodiment example, the first end 40 represents an entrance region 41 (FIG. 4*b*) for the ions. In particular, in the embodiment example, the entrance region 41 is provided with an entrance funnel 45. The second end 42 represents an exit region 43 (FIG. 4*b*) for the ions in the embodiment example. The ion channel 38 contains a gas, through which the ions pass.

The trapped ion mobility filter 36 comprises a first electrode 46, which is represented by a dashed line in FIG. 4*b*. Further, the ion channel 38 comprises a second electrode 48, which is represented by a dashed line in FIG. 4*b*. The first electrode 46 and the second electrode 48 are arranged spaced apart from each other along the axis 44 within the ion channel 38 for defining an ion filter region 50 (region clarified with a dashed arrow line in FIG. 4*b*) therebetween. The first electrode 46 is shaped and aligned so that the first electrode 46 encloses the filter region 50 within the ion channel 38 perpendicular to the axis 44. The second electrode 48 is shaped and aligned so that the second electrode 48 encloses the filter region 50 within the ion channel 38 perpendicular to the axis 44.

The trapped ion mobility filter 36 comprises a plurality of additional electrodes 52 (FIG. 4*c*, 4*d*). In the embodiment example, the ion channel 38 comprises thirty-eight additional electrodes 52, of which only one of the additional electrodes is provided with a reference sign for clarity. The additional electrodes 52 have the same shape and alignment as the first electrode 46 and the second electrode 48. The additional electrodes 52 are located along the axis 44 at said ion channel 38. In particular, the additional electrodes 52 are spaced about 1.5 mm from each other and from the first electrode 46 and the second electrode 48, respectively. The additional electrodes 52 are connected by means of a resistor chain (not shown in the figure). The additional electrodes 52 are supplied with RF confining voltages to prevent the ions from escaping the ion channel 38 laterally. The first electrode 46, the second electrode 48 and those additional electrodes 52, which are located between the first and second electrodes 46, 48, together define the ion channel.

The trapped ion mobility filter 36 comprises a first generator 54 (FIG. 8). The first generator 54 causes a first axial force to be exerted on the ions along the axis 44. To cause the first axial force the first generator 54 applies alternating separating voltages to the first electrode 46 and the second electrode 48, which generate an alternating axial electric field. The first axial force has an effect on the movement of the ions that is dependent on differential mobility by virtue of its interplay with the gas. Further, the trapped ion mobility filter 36 comprises a second generator 56 (FIG. 8). The second generator 56 causes a second axial force to be exerted on the ions along the axis 44. In the embodiment, to cause the first axial force the second generator 56 applies electric direct current (DC) voltages to the first electrode 46 and the second electrode 48, which generate an axial direct current field (DC field). The second axial force is counteracting the first axial force. In particular, the second axial force is counteracting the first axial force temporarily.

Further, the trapped ion mobility filter 36 comprises an electrical controller 58 (FIG. 8). The electrical controller 58 communicates with the first generator 56 and the second generator 58. The electrical controller 58 is set up to configure the first axial force and the second axial force such that ions with a first specific range of differential mobility below a specific value are trapped within the filter region 50 of the ion channel 38 and ions with a second specific range of differential mobility beyond the value, which is different from the first specific range of differential mobility, are transmitted through the ion channel 38.

In the embodiment example, the ion channel 38 is shaped as a tube, with a circular cross-sectional profile perpendicular to the longitudinal axis 44. In the embodiment example, the circular cross-sectional profile has a diameter of 4 mm. Further, in the embodiment, in a longitudinal direction (z) along the axis 44, the ion channel 38 has a dimension of 60 mm.

In the following, the mode of operation of the first embodiment of the trapped ion mobility filter 36 according to the invention is described. The trapped ion mobility filter 36 differs from the trapped ion mobility separator 10 from FIGS. 1*a* and 1*b* in its mode of operation. However, as the first axial force in general is generated as described with reference to FIG. 1, reference is also made to the preceding description.

Figure 5:
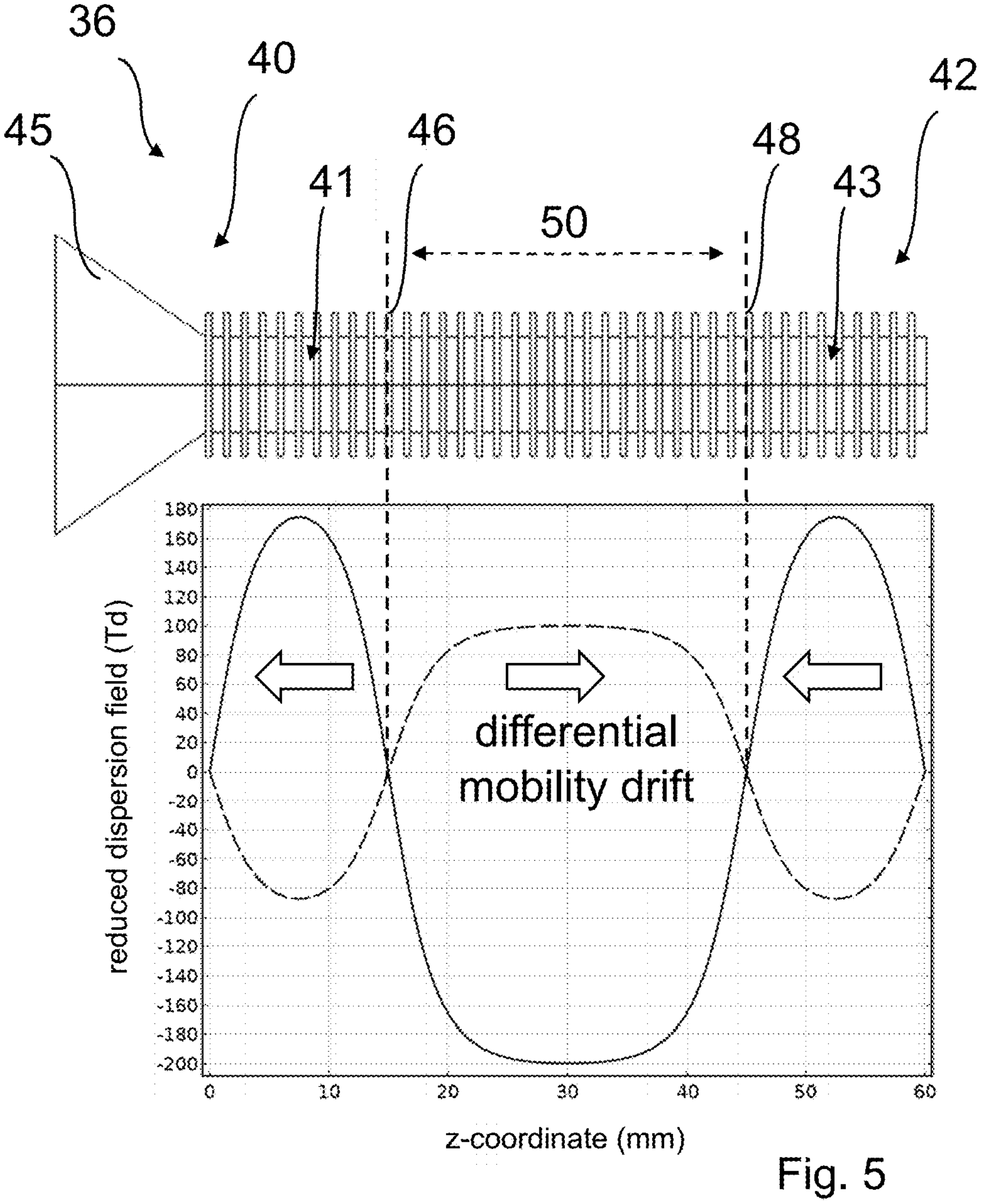
FIG. 5 presents a profile of the dispersion field along the longitudinal direction of the ion channel, as it is generated in the trapped ion mobility filter of FIGS. 4*a*-4*d*.

Ions are introduced to the ion channel 38. In particular, the ions are introduced to the ion channel 38 at the first end 40 (representing the entrance region 41) of the ion channel 38. Thus, the ions are introduced (injected)into the ion channel 38 along the axis 44, along which they move between the first end 40 and the second end 42. In particular, that means, the ions are injected along that axis, along which they will be separated. Subsequently, the ions are guided to the filter region 50. The first axial force, that is imparted to the ions along the axis 44, is generated by the first generator 54, by applying alternating separating voltages to the first electrode 46 and the second electrode 48 to generate an alternating axial electric field. In the embodiment example, in the first time interval the generated alternating axial electric field is directed upstream in the filter region 50. In the second time interval the generated alternating axial electric field is directed downstream in the filter region 50. As the second time interval lasts longer than the first time interval, in total, the generated alternating axial electric field generates a downstream directed differential mobility drift within the filter region 50, or in other words, in total, the ions experience a net displacement towards the second end 42 of the ion channel 38 (FIG. 5). That means, in total, the first axial force leads to a movement of the ions towards the second end 42 of the ion channel 38. At substantially any time, the direction of the first axial force does not change along the axis 44 in the filter region 50. The potentials of the first electrode 46 and the second electrode 48 are distributed to the additional electrodes 52 via the resistor chain.

The alternating separating voltages, applied by the first generator 54, are applied as described above with reference to FIG. 1, differing in that in the first time interval a voltage of −350 V is applied to the first electrode 46 and a voltage of 350 V is applied to the second electrode 48, and that in the second time interval a voltage of 175 V is applied to the first electrode 46 and a voltage of −175 V is applied to the second electrode 48.

Figure 6:
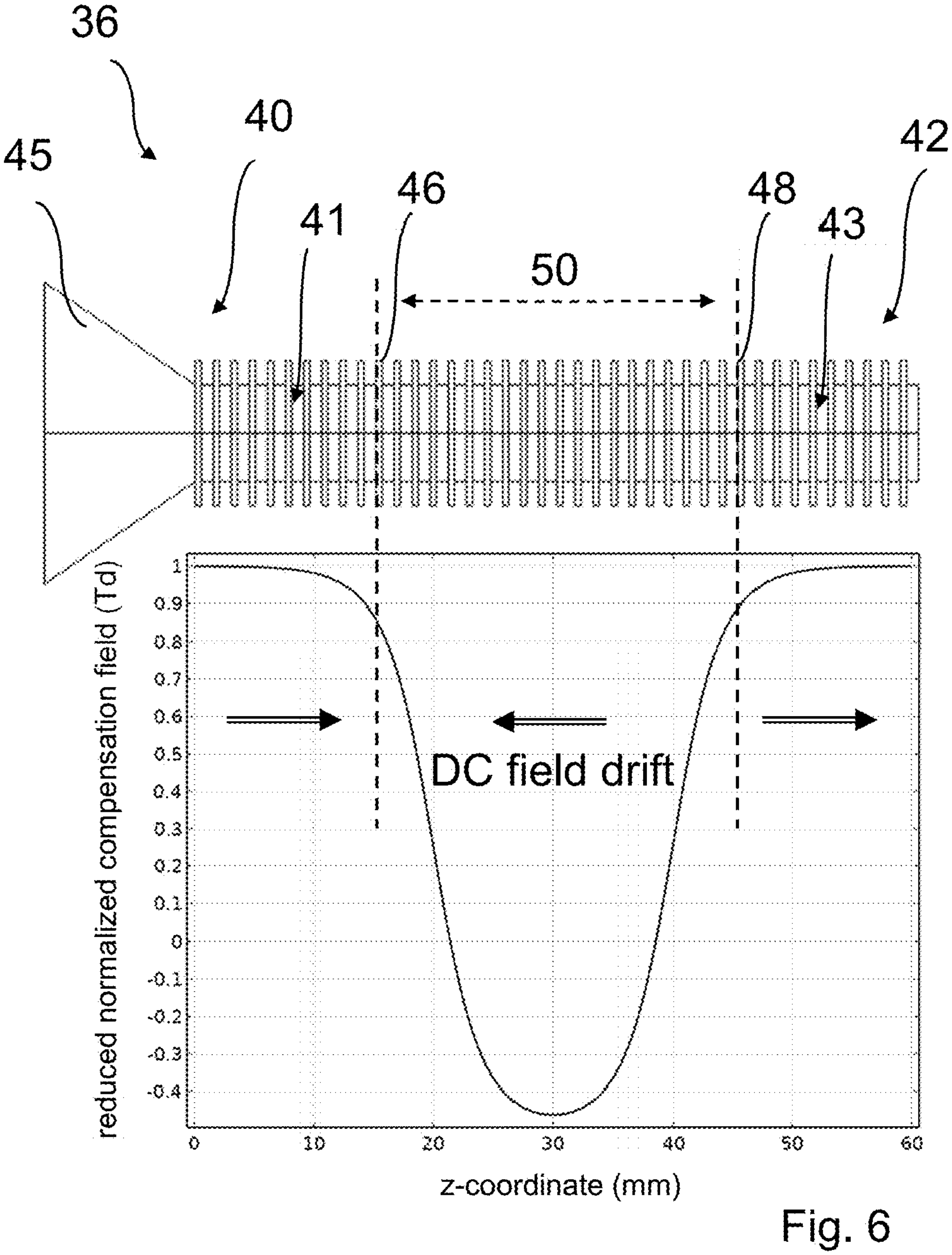
FIG. 6 presents a profile of the normalized compensation field along the longitudinal direction of the ion channel, as it is generated in the trapped ion mobility filter of FIGS. 4*a*-4*d*.

At the same time, the second axial force, that is imparted to the ions along the axis 44 and that counteracts the first axial force temporarily, is generated by the second generator 56 as described with reference to FIG. 1. In contrast to the description for FIG. 1, in this embodiment example, the generated axial DC field is directed upstream in the middle of the filter region 50 (FIG. 6). That means, the generated axial DC field generates an upstream mobility drift (DC field drift), or in other words, the movement of the ions caused by the axial DC field is directed towards the first end 40 of the ion channel 38. The compensation potentials of the first electrode 46 and the second electrode 48 are distributed to the additional electrodes 52 via the resistor chain.

At the same time, radially confining RF voltages are applied to the first electrode 46, the second electrode 48 and the additional electrodes 52 for preventing the ions from escaping the ion channel 38 laterally.

In the embodiment example, a rectangular voltage is applied as separating voltage. Further, in the embodiment example, the applied alternating separating voltage has a frequency of 100 kHz. In the embodiment example, the alternating axial electric field generated by the first generator 54 has a strength of about 200 Td, thus representing an electric field strength to particle density ratio at which the ion mobility has a considerable non-linear dependence on the electric field.

Thus, in the embodiment example, the first axial force effects a movement of the ions which is dependent on the differential mobility of the ions, while the second axial force effects a movement of the ions which is dependent on the mobility of the ions. It should be mentioned at this point that, for example, a gas flow would cause a movement of the ions that does not depend on the mobility of the ions (or in other words, a velocity of the movement of the ions caused by the gas flow does not depend on the mobility of the ions).

During the mode of operation, the first axial force and the second axial force are kept constant over time by the electric controller 58. In the embodiment example, at specified times the controller 58 varies one of the first axial force or the second axial force in strength for releasing trapped ions from the differential mobility filter or the electrical controller 58 varies the applied RF-voltages for quenching the trapped ions.

In the embodiment example, the trapped ion mobility filter 36 is operated at a gas pressure of 5 mbar.

FIG. 5 presents a profile of the reduced dispersion field along the longitudinal direction (z) of the ion channel 38, as it is generated in the trapped ion mobility filter 36 of FIG. 4. As the term "dispersion field" shall represent the above-described alternating axial electric field, this reduced dispersion field corresponds to the first axial force. Again, for better overview, a geometric longitudinal section view of the ion channel 38 along the axis 44 (y-z view) is illustrated on top of the profile, beginning at the first end 40 of the ion channel 38 and ending at the second end 42 of the ion channel 38, and presenting the positions of the first electrode 46 and the second electrode 48 within the ion channel 38.

On the ordinate the reduced dispersion field (Td) is shown, and on the abscissa the z-coordinate (mm), representing the extension of the ion channel 38 in the longitudinal direction, is shown. The alternating separating voltages applied to the first electrode 46 and to the second electrode 48 generate a dispersion field Ed during the first time interval and the second time interval. The reduced dispersion field (Td) describes the ratio of electric field strength and gas particle density. The solid drawn line represents the reduced dispersion field (Td) during the first time interval, and the dashed line represents the reduced dispersion field (Td) during the second time interval. Actually, the second time interval follows on the first time interval. However, as the applied reduced field for both time intervals are plotted simultaneous in the figure, or in other words time independent, the unit of the ordinate is termed as "reduced dispersion field" instead of "reduced field". Further, the mobility drift of the ions, resulting from the alternating electric field, is displayed in the figure.

As can be seen in the figure, the time-dependent dispersion field causes three different differential mobility drifts (represented by arrows): a first one within the filter region 50 of the ion channel 38, another one within the entrance region 41 and within the exit region 43 of the ion channel 38. The differential mobility drift within the filter region 50 is directed downstream. The differential drifts within the entrance region 41 and within the exit region 43 are directed upstream.

The dispersion field in the filter region 50 of the trapped ion mobility filter 36 is switched in polarity compared to the dispersion field of the separation region 24 of the trapped ion mobility separator 10 (FIGS. 1-3), while the rectangular wave form is the same in both embodiments. Therefore, the directions of the differential mobility drift in the filter region 50 is inverted compared to those of the separation region 24. The differential mobility drift in the center of the filter region 50 is directed downstream. The differential drifts at the entrance/exit of the filter region 50 are directed upstream.

The differential mobility drift velocity depends in a non-linear way on the strength of the dispersion field Ed. In the transition between the first upstream and the downstream mobility drift, the differential mobility drift velocity exhibits a gradient which is used for the filtering. The dispersion field Ed is spatially constant in the middle of the filter region 50. The compensation field (FIG. 6) generates three DC field drifts (low-field mobility), which are all counteracting the three differential mobility drifts.

FIG. 6 presents a profile of the normalized compensation field along the longitudinal direction (z) of the ion channel 38, as it is generated in the trapped ion mobility filter 36 of FIG. 4. This normalized compensation field corresponds to the second axial force. Again, for better overview, a geometric longitudinal section view of the ion channel 38 along the axis 44 (y-z view) is illustrated on top of the profile, beginning at the first end 40 of the ion channel 38 and ending at the second end 42 of the ion channel 38, and presenting the positions of the first electrode 46 and the second electrode 48 within the ion channel 38.

On the ordinate the normalized reduced compensation field (Td) is shown, and on the abscissa, the z-coordinate (mm), representing the extension of the ion channel 38 in the longitudinal direction, is shown. The compensation voltages applied to the first electrode 46 and to the second electrode 48 generate a compensation field Ec. The reduced compensation field (Td) describes the ratio of electric compensation field strength and particle density. Here, the reduced dispersion field is normalized to 1 Td. In the embodiment example, the normalized reduced compensation field (Td) is a normalized reduced axial direct current field.

As can be seen in the figure, the compensation field generated three DC field drifts (ion mobility), which are all counteracting the three differential mobility drifts (FIG. 5).

Figure 7:
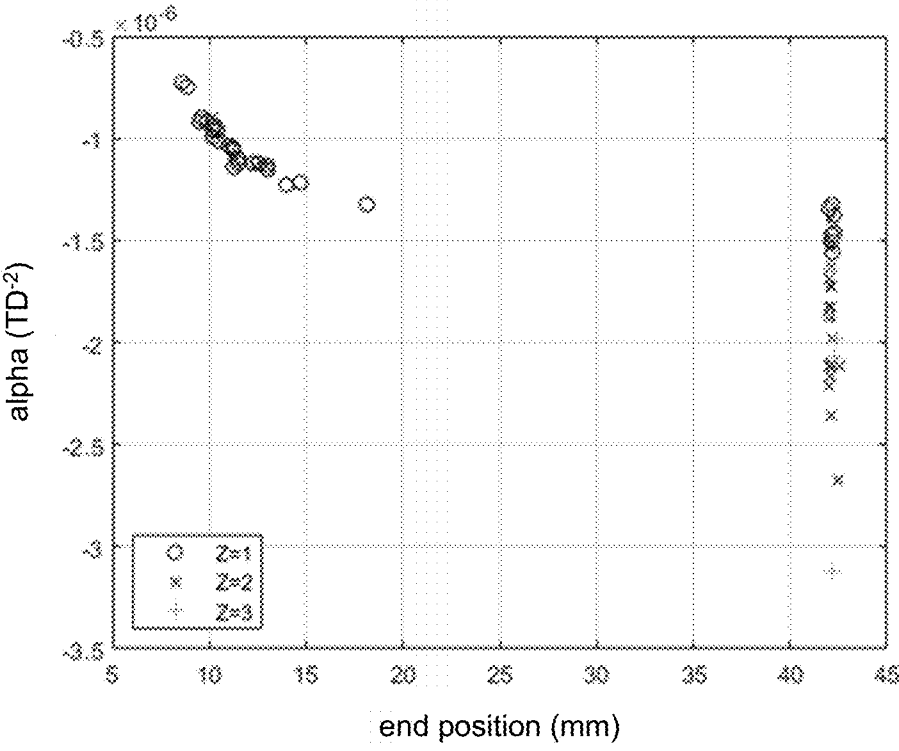
FIG. 7 shows a simulation result, outlining the differential mobility of ions over an end position of the ion species after a defined time interval according to their charge state.

FIG. 7 shows a simulation result, outlining the differential mobility of ions over an end position of the ion species after a defined time interval according to their charge state.

In the simulation, the motion of a peptide ion species of data published in an ASMS poster (2013 Ridgeway et al., ASMS Conference on Mass Spectrometry and Allied Topics: "Maximizing Gas Phase Peak Capacity While Minimizing Analysis Time Through") is calculated. The simulation was performed using the above described dispersion field ENd and compensation field ENc (as described with reference to the FIGS. 4 to 6), while the compensation field ENc is constant in time at a level of about 1.3 Td. The data comprise low- and high field mobility of 62 BSA digest peptides.

On the ordinate the field dependent term $\alpha$ ($Td^{-2}$) is shown, and on the abscissa, the end position (mm) of the ion species after 50 ms is shown. As can be seen in the FIG. 7, the trapping within the differential mobility filter or the transmitting through the differential mobility filter depends on the differential mobility alpha ($\alpha$) of the ion species. As can be seen, most ion species with Z=1 are trapped within the differential mobility filter, while most ion species with Z>1 are transmitted to the end of the filter region 50.

FIG. 8 shows a schematic diagram of a mass spectrometric system 100 according to the invention. The mass spectrometric system 100 is used for analyzing ions. The mass spectrometric system 100 comprises a plurality of analysis devices, which are described in the following.

The mass spectrometric system 100 comprises a separation device (not shown in the figure) for the separation of a mixture of substances. In the embodiment example, the separation device is a liquid chromatography device. Other separation devices (not shown in the figure), such as an electrophoretic device, may be provided and can be coupled to the mass spectrometric system 100.

Further, the mass spectrometric system 100 comprises an ion generator 110. The ion generator 110 comprises an ion source 112. In the embodiment example, the ion source 112 is an electrospray ion source (ESI). The ion source 112 operates at atmospheric pressure. Other ion source types which may be used include, for example thermal spray, desorption ionization (e.g., matrix-assisted laser/desorption ionization (MALDI) or secondary ionization), chemical ionization (CI), photoionization (PI), electron impact ionization (EI), and gas-discharge ionization. Further, the ion generator 110 comprises an ion source chamber 114. The ion source chamber 114 is held at atmospheric pressure. In particular, the ion source chamber 114 incorporates the ion source 112. The ion generator 110 is located downstream of the liquid chromatograph. Further, a transfer capillary 116 is provided. The transfer capillary 116 has a first end 118. The first end 118 of the transfer capillary 116 is connected with the ion source chamber 114. Further, the transfer capillary 116 has a second end 120. The second end 120 of the transfer capillary 116 is connected with a vacuum chamber 124 of a first trapped ion mobility filter 122. In particular, the transfer capillary 116 is set up to introduce ions generated by the (ESI)ion source 112 into the vacuum chamber 124. In the embodiment example, the transfer capillary 116 is a short wide bore capillary with an inner diameter of 1 mm or more and a length of 180 mm or less. Optionally, multiple capillaries or single/multiple orifice inlets can be used to transfer the ions from the ion source chamber 114 to the vacuum chamber 124.

Further, the mass spectrometric system 100 comprises the first trapped ion mobility filter 122. In the embodiment example, the first trapped ion mobility filter is a differential trapped ion mobility filter (dTIMF) 122 according to the invention. In particular, in the embodiment example, the first trapped ion mobility filter 122 corresponds to the trapped ion mobility filter 36 from FIG. 4, having a circular cross-sectional profile along the axis 44. In this respect, reference is also made to the preceding description. The trapped ion mobility filter 122 is located downstream of the ion generator 110. The trapped ion mobility filter 122 comprises the vacuum chamber 124. In the embodiment example, the vacuum chamber 124 is held at an elevated pressure between 300 Pa and 3000 Pa. It is conceivable, that, in another preferred embodiment, the vacuum chamber comprises an additional sub-ambient ESI ion source. Further, the trapped ion mobility filter 122 comprises a deflector electrode 126. It is conceivable, that, in another preferred embodiment, an additional MALDI source (not shown in the figure) can be located at the position of the deflector electrode. Further, the trapped ion mobility filter 122 comprises an entrance funnel 128. In particular, the entrance funnel 128 is an RF-entrance funnel. The entrance funnel 128 is set up set up for transferring ions to a filter region 134. Further, the trapped ion mobility filter 122 comprises the filter region 134. The filter region 134 is set up for separating ions. Further, the trapped ion mobility filter 122 comprises a downstream ion trap 130. The ion trap 130 is set up for trapping ions transmitted through the filter region 134. In the embodiment example, the differential trapped ion mobility filter 122 operates at a pressure of 500 Pa. Further, an inter-chamber aperture 138 is provided. Through the inter-chamber aperture 138 ions can be transmitted from the vacuum chamber 124 to a vacuum chamber 142 of a second trapped ion mobility separator 140.

Further, the mass spectrometric system 100 comprises the second trapped ion mobility separator 140. In the embodiment example, the second trapped ion mobility separator is a TIMS 140 constructed and operated in a manner to disperse ions according to ion mobility (hereinafter referred to as classical TIMS 140). The classical TIMS 140 is set up for separating ions according to their mobility. The classical TIMS 140 is located downstream of the differential trapped ion mobility filter 122. The classical TIMS 140 comprises a vacuum chamber 142. In the embodiment example, the vacuum chamber 142 is held at a lower pressure than the pressure of the upstream vacuum chamber 124, e.g., at a pressure between 100 Pa and 300 Pa. Further, the classical TIMS 140 comprises a deflector electrode 144. Further, the classical TIMS 140 comprises an entrance funnel 146. In particular, the entrance funnel 146 is an RF-entrance funnel. Further, the classical TIMS 140 comprises a separation region 148. The separation region 148 is set up for separating ions.

The ion trap 130 has preferably the storage capacity of the classical TIMS 140.

Further, the mass spectrometric system 100 comprises an ion guide apparatus 150. The ion guide apparatus 150 is set up for guiding ions. The ion guide apparatus 150 is located downstream of the classical TIMS 140. The ion guide apparatus 150 comprises an RF-ion guide 152. Further, the ion guide apparatus 150 comprises an ion guide chamber 154. The ion guide chamber 154 incorporates the RF-ion guide 152. The ion guide chamber 154 serves as a pressure stage between the medium vacuum of the classical TIMS 140 and the high vacuum under which a downstream located mass filter apparatus 156 is operated.

Further, the mass spectrometric system 100 comprises the mass filter apparatus 156. The mass filter apparatus 156 is set up to guide or select ions according to mass. The mass filter apparatus 156 is located downstream of the ion guide apparatus 150. The mass filter apparatus 156 comprises a mass filter 158. In the embodiment example, the mass filter 158 is a quadrupole mass filter. Further, the mass filter apparatus 156 comprises a mass filter chamber 160. The mass filter chamber 160 contains the quadrupole mass filter 158.

Further, the mass spectrometric system 100 comprises a fragmentation cell 162. The fragmentation cell 162 is set up to fragment larger ions to allow mass spectrometric measurement of the ion fragments. The fragmentation cell 162 is located downstream of the mass filter apparatus 156. In the embodiment example, fragmentation is done using collision induced dissociation (CID). However, any other known type of fragmentation may also be used including, but not limited to, infrared multiple photon-dissociation (IRMPD) or ultraviolet photo-dissociation (UVPD), surface induced dissociation (SID), photo-dissociation (PD), electron capture dissociation (ECD), electron transfer dissociation (ETD), collisional activation after electron transfer dissociation (ETcD), activation concurrent with electron transfer dissociation (AI-ETD) and fragmentation by reactions with highly excited or radical neutral particles. The fragmentation cell 162 comprises electrodes 164. Further, the fragmentation cell 162 comprises a fragmentation cell chamber 166. The fragmentation cell chamber 166 contains the electrodes 164. The fragmentation by CID can be switched on and off, controlled by instrumental parameters, e.g., an axial acceleration voltage. Precursor ions can be trapped in the fragmentation cell 162 without being fragmented, as well as fragment ions when fragmentation is enabled.

Further, the mass spectrometric system 100 comprises a mass analyzer 168. In the embodiment example, the mass analyzer 168 is a time-of-flight analyzer with orthogonal ion injection (OTOF-MS). Other possible mass analyzers include an electrostatic ion trap, an RF ion trap, an ion cyclotron frequency ion trap and a quadrupole mass filter. The mass analyzer 168 is set up to analyze ions according to mass. The mass analyzer 168 is located downstream of the fragmentation cell 162. The mass analyzer 168 comprises an accelerator 170 (or pulser). Further, the mass analyzer 168 comprises a flight tube 172. In the embodiment example, the flight tube 172 is field free. Further, the mass analyzer 168 comprises a reflector 174. Further, the mass analyzer 168 comprises an ion detector 176. An additional reflector can be located between the accelerator 170 and the ion detector 176 such that the ions are reflected twice in the reflector 174 and move on w-shaped trajectories instead of V-shaped trajectories.

In the following, the basic mode of operation of the mass spectrometric system 100 according to the invention is described:

Sample material is eluted from the liquid chromatography device (not shown in the figure). Ions are generated by the (ESI)ion source 112 using the sample material eluted from the liquid chromatography device. Via the transfer capillary 116, the generated ions are introduced into the first vacuum chamber 124 of the first trapped ion mobility filter, the dTIMS 122. Subsequently, the ions are deflected into the RF-entrance funnel 128 of the dTIMS 122 by a repelling electric DC-potential applied to the deflector electrode 126 of the dTIMS 122. The RF-entrance funnel 128 collects the ions and guides them to the dTIMS 122. In the filter region 134 of the dTIMS 122 the ions are separated by their differential mobilities into those which pass the device for analysis and those which are held back in the filter region of the device by trapping.

Subsequently, the transmitted ion species are trapped in the ion trap 130 and then transmitted from the vacuum chamber 124 of the dTIMS 122 through the inter-chamber aperture 138 into the vacuum chamber 142 of the classical TIMS 140. In the classical TIMS 140 the transmitted ions are then deflected by the deflector electrode 144 into the RF-entrance funnel 146. The RF-entrance funnel 146 collects the ions and guides them to the separation region 148 of the classical TIMS 140. In the separation region 148 of the classical TIMS 140 the ions are separated according to their mobility. In the embodiment example, the classical TIMS 140 uses a gas flow and a DC field barrier as the two counteracting forces. The gas flow in the classical TIMS 140 is generated by pumping away gas from the exit of the classical TIMS 140 through a pumping port (not shown in the figure) and through an aperture (not shown in the figure) between the vacuum chamber 124 and the vacuum chamber 142. During an accumulation phase, the two counteracting forces are balanced such that, for each ion species of interest, an equilibrium point of zero velocity exists within the classical TIMS 140. During a subsequent elution phase, the trapped ion species are eventually released from the classical TIMS 140 by continuously changing the DC-field gradient such that the ion species in the classical TIMS 140 are sequentially eluted according to their mobility K. This relative change in the opposing axial forces may be progressive, such that ion species of increasing mobility K successively exit the classical TIMS 140. In the embodiment example, the dTIMS 122 and the classical TIMS 140 are operated in parallel accumulation mode. That means, the dTIMS 122 continuously filters ions and traps the filtered ions while previously transferred ions are separated in the downstream located classical TIMS 140.

Subsequently, the ions released from the classical TIMS 140 enter the downstream located ion guide chamber 154 of the ion guide apparatus 150. The RF-ion guide 152 guides the ions into the further downstream located mass filter chamber 160 of the mass filter apparatus 156, in which the mass filter 158 is located. In the mass filter 158, ions are guided or selected according to mass. Subsequently, the ions that pass through the mass filter 158 are directed to the fragmentation cell 162, located downstream of the mass filter apparatus 156 in the fragmentation cell chamber 166. In the fragmentation cell 162, larger ions are dissociated into fragment ions to allow mass spectrometric measurement of the ion fragments. DC-voltages are applied to the electrodes 164 of the fragmentation cell 162 to generate an axial DC-field for ejecting the ion fragments into the downstream located mass analyzer 168, where they are analyzed according to their mass.

A preferred application of a tandem dTIMS/TIMS (not shown in the figures) being part of a mass spectrometric system can be, for example, bottom-up proteomics.

Typically, in bottom-up proteomics, digest peptides are separated in a liquid chromatography device and then ionized in an electrospray ion source. Often, the separated peptide ions are additionally separated in the gas phase using a classical ion mobility separator constructed and operated to disperse ions according to ion mobility. The separated peptide ions are further isolated according to mass-to-charge ratio in a mass filter, and then fragmented in a fragmentation cell. Mass spectra of the fragment ions are acquired and used to identify the peptide ions and the associated proteins. However, the information content of fragment mass spectra of singly charged peptide ions is commonly limited. Furthermore, other singly charged background ion species together with the singly charged peptide ions may compromise the performance of the mass spectrometric system, for example the classical ion mobility separator, the fragmentation cell, or the mass analyzer. Therefore, it is of great interest to eliminate singly charged background ions and singly charged peptide ions from the analysis, especially because these singly charged ion species often account for a significant number of all ion species.

The aforementioned tandem dTIMS/TIMS can be used here in an advantageous manner, as a dTIMS can substantially separate ion species according to their charge state. In a preferred embodiment, the dTIMS can be operated such that ion species with charge state $Z>1$ are predominantly transferred to the downstream classical TIMS while the fraction predominately comprising ion species with charge state $Z=1$ is not transferred but discarded. Alternatively, it is conceivable, the fraction predominately comprising ion species with charge state $Z=1$ can separately be transferred to the downstream classical TIMS for analysis. Thus, an advantage of this tandem dTIMS/TIMS is that the classical TIMS is not overloaded with singly charged ion species whose fragment spectra have no or little information but consume a considerable amount of the storage capacity of the classical TIMS. In this way, the performance of the classical TIMS is kept high by reducing the useless singly charged ion species.

The invention has been shown and described above with reference to a number of different embodiments thereof. It will be understood, however, by a person skilled in the art that various aspects or details of the invention may be changed, or various aspects or details of different embodiments may be arbitrarily combined, if practicable, without departing from the scope of the invention. Generally, the foregoing description is for the purpose of illustration only, and not for the purpose of limiting the invention, which is defined solely by the appended claims, including any equivalent implementations, as the case may be.

REFERENCE SIGNS

10 trapped ion mobility separator
12 ion channel
14 first end of the ion channel
15 entrance region
16 second end of the ion channel
17 exit region
18 axis (ion channel)
20 first electrode
22 second electrode
24 separation region
26 additional electrodes
36 trapped ion mobility filter
38 ion channel
40 first end of the ion channel
41 entrance region
42 second end of the ion channel
43 exit region
44 axis (ion channel)
45 entrance funnel
46 first electrode
48 second electrode
50 filter region
52 additional electrodes
54 first generator
56 second generator
58 electrical controller
100 mass spectroscopic system
110 ion generator
112 ion source
114 ion source chamber
116 transfer capillary
118 first end of the transfer capillary
120 second end of the transfer capillary
122 trapped ion mobility filter
124 vacuum chamber
126 deflector electrode
128 entrance funnel
130 ion trap
134 filter region
138 inter-chamber aperture
140 trapped ion mobility separator
142 vacuum chamber
144 deflector electrode
146 entrance funnel
148 separation region
150 ion guide apparatus 152 RF-ion guide
154 ion guide chamber
156 mass filter apparatus
158 mass filter
160 mass filter chamber
162 fragmentation cell
164 electrodes
166 fragmentation cell chamber
168 mass analyzer
170 accelerator
172 flight tube
174 reflector
176 ion detector
X first lateral extension direction of the ion channel
Y second lateral extension direction of the ion channel
Z longitudinal extension direction of the ion channel

The invention claimed is:

1. A trapped ion mobility filter comprising:

an ion channel in which ions move along an axis between a first end of said ion channel, at which ions are introduced into said ion channel, and a second end of said ion channel, said ion channel containing a gas through which the ions pass, wherein the ion channel is supplied with radially confining voltages for preventing the ions from escaping the ion channel laterally, at least a first electrode and a second electrode arranged spaced apart from each other along said axis of said ion channel for defining an ion filter region therebetween, a first generator that causes a first axial force to be exerted on the ions along said axis by applying an alternating separating voltage to said first electrode and said second electrode to generate an alternating axial electric field, the first axial force having an effect on the movement of the ions that is dependent on differential mobility by virtue of its interplay with said gas, wherein, at substantially any time, the direction of said first axial force does not change along said axis in said filter region, and wherein said alternating separating voltage is applied so that for a first time interval an electric field with a first field strength is generated, and for a second time interval, following said first time interval, an opposing electric field with a second field strength is generated, which is lower in magnitude than said first field strength, said first time interval lasting a shorter time span than said second time interval, a second generator that causes a second axial force to be exerted on the ions along said axis, which is counteracting said first axial force at least temporarily, and an electrical controller which communicates with said first generator and said second generator to configure said first axial force and said second axial force such that ions with a first specific range of differential mobility are trapped within said filter region of said ion channel and ions with a second specific range of differential mobility, which is different from said first specific range of differential mobility, are transmitted through said ion channel.

2. The trapped ion mobility filter according to claim 1, wherein said separating voltage is a substantially rectangular voltage or a bi-sinusoidal voltage.

3. The trapped ion mobility filter according to claim 1, wherein said applied separating voltage has a frequency of 50 kHz to 2 MHz.

4. The trapped ion mobility filter according to claim 1, wherein the alternating axial electric field generated by said first generator has a maximum strength of 20 Td to 500 Td.

5. The trapped ion mobility filter according to claim 1, wherein said second axial force is caused by said second generator applying compensation voltages to said first electrode and said second electrode to generate an electrical compensation field, or by said second generator generating an axial gas flow.

6. The trapped ion mobility filter according to claim 1, wherein said first generator and said second generator are configured such that at least one of the axial forces is changing in strength along said axis.

7. The trapped ion mobility filter according to claim 1, wherein said first electrode and said second electrode are shaped and aligned so that said first electrode and said second electrode are enclosing said filter region within said ion channel perpendicular to said axis.

8. The trapped ion mobility filter according to claim 7, wherein said ion channel comprises a plurality of additional electrodes of the same shape and alignment as said first electrode and said second electrode, wherein said additional electrodes are located along said axis within said ion channel between said first electrode and said second electrode, and/or whereby said additional electrodes are connected by means of a resistor chain or are supplied with voltages using separate voltage generators.

9. The trapped ion ion mobility filter according to claim 1, wherein said ion channel has an elongate cross-sectional profile perpendicular to the axis with a first direction of extension and a second direction of extension, the first direction of extension being longer than the second direction of extension, or a circular cross-sectional profile perpendicular to the axis.

10. The trapped ion mobility filter according to claim 1, further comprising a vacuum system that is designed and configured to operate the trapped ion mobility filter at a gas pressure in a range of 0.5 mbar to 20 mbar.

11. The trapped ion mobility filter according to claim 1, further comprising an ion trap for storing ions, located downstream of said filter region within said ion channel.

12. The trapped ion mobility filter according to claim 1, wherein said separating voltage applied by said first generator is applied so that the potential applied to said first electrode has opposite polarity to the potential applied to said second electrode.

13. A mass spectrometric system comprising an ion source, a mass analyzer with an ion detector, and at least a first trapped ion mobility filter located downstream of said ion source and/or upstream of said mass analyzer, wherein said first trapped ion mobility filter comprises:

an ion channel in which ions move along an axis between a first end of said ion channel, at which ions are introduced into said ion channel, and a second end of said ion channel, said ion channel containing a gas through which the ions pass, wherein the ion channel is supplied with radially confining voltages for preventing the ions from escaping the ion channel laterally, at least a first electrode and a second electrode arranged spaced apart from each other along said axis of said ion channel for defining an ion filter region therebetween, a first generator that causes a first axial force to be exerted on the ions along said axis by applying an alternating separating voltage to said first electrode and said second electrode to generate an alternating axial electric field, the first axial force having an effect on the movement of the ions that is dependent on differential mobility by virtue of its interplay with said gas, wherein, at substantially any time, the direction of said first axial force does not change along said axis in said filter region, and wherein said alternating separating voltage is applied so that for a first time interval an electric field with a first field strength is generated, and for a second time interval, following said first time interval, an opposing electric field with a second field strength is generated, which is lower in magnitude than said first field strength, said first time interval lasting a shorter time span than said second time interval, a second generator that causes a second axial force to be exerted on the ions along said axis, which is counter-acting said first axial force at least temporarily, and an electrical controller which communicates with said first generator and said second generator to configure said first axial force and said second axial force such that ions with a first specific range of differential mobility are trapped within said filter region of said ion channel and ions with a second specific range of differential mobility, which is different from said first specific range of differential mobility, are transmitted through said ion channel.

14. The mass spectrometric system according to claim 13, further comprising a fragmentation cell, located between said first trapped ion mobility filter and said mass analyzer.

15. The mass spectrometric system according to claim 14, further comprising a mass filter, located between said first trapped ion mobility filter and said fragmentation cell.

16. The mass spectrometric system according to claim 13, further comprising a second ion mobility separator, which is located downstream of said first trapped ion mobility filter.

17. The mass spectrometric system according to claim 16, further comprising a first housing assigned to the first trapped ion mobility filter and a second housing assigned to the second ion mobility separator, the first housing and the second housing containing a gas, whereas the gas assigned to the first housing differs from the gas assigned to the second housing.

18. The mass spectrometric system according to claim 16, further comprising an ion trap for storing ions, located between said first trapped ion mobility filter and said second ion mobility separator.

19. A method for analyzing ions using a first trapped ion mobility filter, comprising the steps of:

providing an ion channel in which ions move along an axis between a first end of said ion channel, at which ions are introduced into said ion channel, and a second end of said ion channel, said ion channel containing a gas through which the ions pass, wherein the ion channel is supplied with radially confining voltages for preventing the ions from escaping the ion channel laterally, providing at least a first electrode and a second electrode arranged spaced apart from each other along said axis of said ion channel for defining an ion filter region therebetween, generating a first axial force that is imparted to the ions along said axis by applying an alternating separating voltage to said first electrode and said second electrode to generate an alternating axial electric field, the first axial force having an effect on the movement of the ions that is dependent on differential mobility by virtue of its interplay with said gas, wherein, at substantially any time, the direction of said first axial force does not change along said axis in said filter region, applying said alternating separating voltage so that for a first time interval an electric field with a first field strength is generated, and for a second time interval, following said first time interval, an opposing electric field with a second field strength is generated, which is lower in magnitude than the first field strength, said first time interval lasting a shorter time span than said second time interval, generating a second axial force that is imparted to the ions along said axis and that counteracts said first axial force at least temporarily, configuring said first axial force and said second axial force such that ions with a first specific range of differential mobility are trapped within said filter region of said ion channel and ions with a second specific range of differential mobility, which is different from said first specific range of differential mobility, are transmitted through said ion channel.

20. The method for analyzing ions according to claim 19, further comprising generating the alternating axial electric field with a maximum strength of 20 Td to 500 Td.

21. The method for analyzing ions according to claim 19, further comprising changing at least one of the axial forces in strength along said axis.

22. The method for analyzing ions according to claim 19, further comprising analyzing separated ions as a function of mobility in a second ion mobility separator located downstream of said first trapped ion mobility filter.

23. The method for analyzing ions according to claim 22, further comprising analyzing separated ions as a function of mass in a mass analyzer located downstream of said second ion mobility separator constructed and operated to disperse ions according to ion mobility.

24. The method for analyzing ions according to claim 19, further comprising dissociating filtered and/or separated ions into fragment ions and analyzing said fragment ions in a mass analyzer located downstream of said first trapped ion mobility filter and/or a second ion mobility separator, constructed and operated to disperse ions according to ion mobility and being located downstream of said first trapped ion mobility filter.

25. The method for analyzing ions according to claim 24, further comprising selecting and/or filtering the filtered and/or separated ions according to mass and/or according to their charge state prior to fragmentation.

* * * * *